United States Patent [19]
Shiohara et al.

[11] Patent Number: 5,852,710
[45] Date of Patent: *Dec. 22, 1998

[54] APPARATUS AND METHOD FOR STORING IMAGE DATA INTO MEMORY

[75] Inventors: Susumu Shiohara; Michio Maruyama, both of Nagano, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 549,527

[22] Filed: Oct. 27, 1995

[30] Foreign Application Priority Data

| Oct. 28, 1994 | [JP] | Japan | 6-265069 |
| Dec. 27, 1994 | [JP] | Japan | 6-325637 |
| Feb. 15, 1995 | [JP] | Japan | 7-027175 |
| Sep. 4, 1995 | [JP] | Japan | 7-226893 |

[51] Int. Cl.$^6$ ............................................. G06K 15/00
[52] U.S. Cl. ................................. 395/115; 395/112
[58] Field of Search .................... 395/101, 112, 395/114, 115, 116, 835, 876, 877, 888, 885, 133, 102; 358/261.2, 426, 261.4

[56] References Cited

U.S. PATENT DOCUMENTS

| 4,394,774 | 7/1983 | Widergren et al. | 382/56 |
| 4,437,681 | 3/1984 | Fujinawa et al. | 358/426 |
| 4,907,094 | 3/1990 | Mishima et al. | 358/437 |
| 5,129,049 | 7/1992 | Cwzzo et al. | 395/113 |
| 5,500,928 | 3/1996 | Cook et al. | 395/133 |

FOREIGN PATENT DOCUMENTS

| 0487282 | 5/1992 | European Pat. Off. | G06F 15/64 |
| 0609985 | 1/1993 | European Pat. Off. | G06F 15/64 |
| 2702580 | 9/1994 | France | G06F 15/62 |
| 6-79955 | 3/1994 | Japan | B41J 29/38 |
| 7-32448 | 4/1995 | Japan | H04N 1/21 |

OTHER PUBLICATIONS

Patent Abstracts of Japan vol. 96, No. 001 & JP–A–08 018752 (Toshiba Corp), Jan. 19, 1996, *abstract.

*Primary Examiner*—Arthur G. Evans
*Attorney, Agent, or Firm*—Sughrue, Mion, Zinn, Macpeak & Seas, PLLC

[57] ABSTRACT

In the case where the free area of a memory in a printer is insufficient when one-page's image data from a host computer are converted into intermediate codes so as to be stored into the memory, the intermediate codes are converted into real image data, that is, bit map data, and the real image data are compressed and stored into the memory. If compressibility is insufficient in spite of the compression of the real image data, the real image data are converted into data of a data format higher in compressibility and then the converted data are compressed. A plurality of data formats different in compressibility are prepared so that an optimum data format is selected. Further, when the number of times of compression carried out to the one-page's image data or the time required for compression is larger than a threshold, a user is informed of this fact and given a proposal to extend the memory.

18 Claims, 15 Drawing Sheets

FIG. 5 (A)
STANDARD TYPE
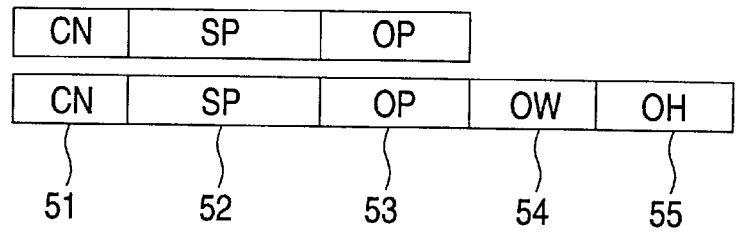
EX.
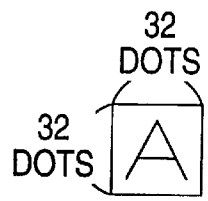
CHARACTER DATA STORED
IN ADDRESS INDICATED BY
SOURCE POINTER 52
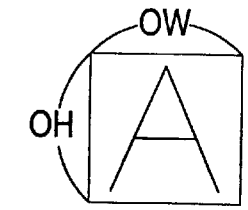
CHARACTER DATA WRITTEN
IN ADDRESS INDICATED BY
OBJECT POINTER 53
FIG. 5 (B)
STRAIGHT LINE TYPE
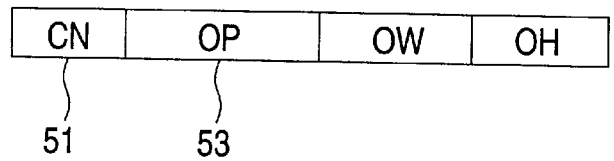
FIG. 5 (C)
COMPRESSED TYPE
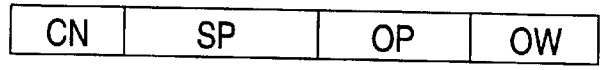

ONE-PAGE PRESERVING PROCESS

APPARATUS AND METHOD FOR STORING IMAGE DATA INTO MEMORY

BACKGROUND OF THE INVENTION

1. Field of the invention

The present invention generally relates to an apparatus and method for storing image data into a memory and particularly relates to a technique for compressing image data or changing the data format thereof to thereby make it possible to store the image data into a memory having an insufficient capacity.

2. Background

An image forming apparatus such as a display driver, a printer, etc., is generally designed so that, in an image forming process, all image data received from a host apparatus are once stored in the form of intermediate codes on a memory and successively read out and converted into real images to be displayed or printed out through a print engine.

As shown in FIG. 1, a specific example of conventional image processing systems comprises a host apparatus 1, an image forming apparatus 2, and an image display output apparatus 3. For example, in a general computer system, the host apparatus 1 is constituted by a personal computer, the image forming apparatus 2 is constituted by a circuit for controlling the inside of a printer or by a circuit for outputting a signal to a display, and the image display output apparatus 3 is constituted by a print engine of the printer or by the display.

Incidentally, the image forming apparatus 2 includes a data receiving portion 4, memories 5 and 6, an image processing portion 7, a memory management portion 8, an image display portion 9, and a display buffer 10.

The data receiving portion 4 receives data from the host apparatus 1 and temporarily stores the received data into the memory 5 as a system heap. The image processing portion 7 reads the received data from the memory 5 and analyzes the data to generate image data in the form of intermediate codes.

The memory management portion 8 which serves to secure/release the memory 6 as an application heap, searches the memory 6 for a free memory area of a size requested by the image processing portion 7 and stores the intermediate code form image data from the image processing portion 7 into the free memory area. If there is no free memory area which can be secured, then the memory management portion 8 immediately outputs memory error to the image processing portion 7.

The image display portion 9 successively reads the intermediate code form image data from the memory 6, converts the data into complete bit map form real image data and develops the real image on the display buffer 10. This real image is read from the display buffer 10 into the image display output apparatus 3 and displayed or printed out.

In the conventional image forming apparatus 2, all image data in the form of intermediate codes are stored into the memory 6 in order to save memory consumption. There is however some case where the size of the intermediate code form data is larger than the size of the real image data, so that there may arise a disadvantage in that conversion into such intermediate code form data increases memory consumption. That is, as for intermediate codes, for example, text is composed of bit map data of respective characters and information of page position. Graphics is composed of pass data defining its form. An image, such as a photograph, is composed of bit map data thereof, and page position information. In the case where there are a large number of delicate and complex characters/graphics in one page, the quantity of intermediate code form data becomes larger than the quantity of real image data because the quantity of position information of the characteristics/graphics or the quantity of pass data is enormous.

Further, because the memory management portion 8 returns a memory error to the image processing portion 7 immediately when the memory management portion 8 cannot find any free memory area for storing image data from the memory 6, a memory-over error is apt to arise when particularly large image data is processed and, furthermore, the image processing portion 7 must perform complex processing for failure in securing the free memory area.

Further, because the image display portion 9 must perform a process of converting the complex intermediate codes stored in the memory 6 into a real image and a process of developing the real image on the display buffer 10, there arises a problem in that image formation is apt to end in failure when the image forming process becomes too late for the increase in quantity of intermediate codes or the complication of the image forming process caused by the intermediate codes.

Such a problem is solved at once if the memory is extended to increase the capacity of the memory. Because whether the cause is shortage of memory or not, is not clear to the user when there arises a situation in which printing is impossible or a large time is required for printing, whether the memory is to be extended or not to be can be hardly judged by the user.

Further, there is known a printer in which elimination of shortage of memory is attained by changing the mode to a low resolution mode when the printer is set to a high resolution mode, and by converting image data generated with high resolution into image data of low resolution to prevent interruption of printing caused by shortage of memory (see Japanese Patent Unexamined Publication Hei-6-79955).

When the original image data of high resolution is to be converted into image data of low resolution, the original image data, however, can be converted only into image data of low resolution of a specific level which is set in advance in accordance with the specifications of the print engine or mechanism controller. For example, in the case of specifications with a 600 dpi high resolution mode and a 300 dpi low resolution mode, the original image data of 600 dpi×600 dpi can converted only into image data of 300 dpi×300 dpi.

Therefore, when shortage of memory cannot be eliminated still by the image data of 300 dpi×300 dpi, it is possible to attain elimination of shortage of memory finally only by further compressing the image data. Accordingly, an error caused by a shortage of memory arises to bring about a disadvantage in that printing is interrupted. Further, because resolution is reduced at a dash up to 300 dpi×300 dpi even in the case where shortage of memory can be eliminated without lowering of resolution to 300 dpi×300 dpi, greater lowering of picture quality than necessary is brought about. In short, in the aforementioned conventional technique, compressibility cannot be controlled to a necessary and sufficient degree because compressibility cannot be adjusted substantially stagelessly so that shortage or surplus of compression may arise.

Further, because the image data of 300 dpi×300 dpi is ¼ as small in the number of pixels as the original image data, the small size image ¼ as small in area as the original image is outputted if the image data of 300 dpi×300 dpi is directly displayed or printed out. Therefore, to output the same size image as the original image, it is necessary to employ a method of doubling laser beam size or dot size of the printer, a method of doubling the number of scanning lines in the display unit, or the like. Therefore, the configuration of the printer engine or engine controller must be complicated to make such operation possible. That is, hardware and software structure adapted to single resolution cannot be used.

Further, because there is carried out no process but a process of converting the original image data into image data of merely halved resolution, it is impossible to restore the original image data from the data after conversion. As a result, the original image of high resolution cannot be formed. That is, shortage of memory cannot be eliminated without substantial lowering of picture quality.

SUMMARY OF THE INVENTION

An object of the present invention is to reduce the size of a necessary memory area as greatly as possible when image data are stored in a memory.

Another object of the present invention is to secure a free memory area for storing new image data into a memory area already fully filled with image data to thereby prevent memory-over error from appearing frequently.

A further object of the present invention is to suppress the processing for converting intermediate codes into a real image so that the processing is effected not excessively to thereby prevent error from occurring in the image forming processing when image data is to be stored in a memory in the form of intermediate codes as a general rule.

A further object of the present invention is to make a user surely recognize shortage of a memory to which image data is to be stored to thereby help the user to properly extent the memory.

A further object of the present invention is to adjust compressibility substantially nearly stagelessly while suppressing lowering of picture quality in the case of shortage of memory for storing image data to thereby make it possible to compress the image data with necessary and sufficient compressibility to eliminate shortage of memory.

A further object of the present invention is to perform a process of restoring the original image from compressed image data and displaying or printing out the original image by using only hardware and software structure adapted to single resolution.

According to an apparatus of the present invention, at least a part of image data is compressed and the compressed image data is stored into a memory in the case where there is the possibility of shortage of the free area of the memory when the image data is to be stored into the memory. When the image data is compressed, a value concerning the processing quantity of the compression is counted. When the thus counted value exceeds a predetermined threshold, the user is informed. As the value concerning the processing quantity of the compression, there can be employed, for example, the quantity of data compressed before all image data are stored into the memory, the time elapsed from the start of the compression of the image data before all image data are stored into the memory, or the like.

According to the apparatus of the present invention, elimination of shortage of memory is attained by compressing data already stored in the memory or new data to be stored into the memory when there arises a risk of shortage of memory in the case where image data are to be stored into the memory. When, in this occasion, the processing quantity of the compression executed becomes very large, the user is informed. By this information, the user can know shortage of memory, so that a measure to extend the memory, or the like, can be taken easily.

In an apparatus according to a second aspect of the present invention, when image data are stored in a first data format such as, for example, intermediate code into a memory, a judgment is made upon each element of the image data as to whether data size in the first data format exceeds data size in a second data format such as, for example, bit map data or not. If the judgment result is affirmative, each element of the image data is stored, not in the first data format but in the second data format, into the memory.

According to this invention, in an image forming apparatus in which image data are stored, for example, in the form of intermediate codes, into the memory and then the intermediate codes are converted into bit map data to be displayed or printed out, image data are stored, not in the form of intermediate codes but in the form of bit map data, into the memory when the data size of the intermediate codes is larger than the data size of the bit map data. Accordingly, because image data are stored into the memory in the form of a smaller data size selected from the data size of intermediate codes and the data size of bit map data, wasteful consumption of memory can be saved so that, as a result, memory error hardly arises.

In an apparatus according to a third aspect of the present invention, when the memory has no free area of a sufficient capacity to store image data, data which can be erased or compressed are selected from data already stored in the memory and the selected data are erased or compressed in order to form a free area of a sufficient capacity.

According to this apparatus, the free memory area is increased by erasion or compression of data in the memory so that the free memory area of a sufficient capacity is secured easily and, as a result, memory error hardly occurs.

Incidentally, in a preferred embodiment, when the sufficient free memory area cannot be secured, data in the band currently subjected to a displaying or printing-out process is retrieved from the memory so that the retrieved data is erased from the memory when the displaying or printing-out process for the band data is completed, and further when the sufficient free memory area cannot be secured after the erasion or when there is no erasable data in the memory, band data in the form of intermediate code is retrieved and compressed.

In an apparatus according to a fourth aspect of the present invention, image data are stored, in a first data format such as, for example, intermediate codes, into a memory so that the image data of the first data format are read from the memory and converted into a second data format such as, for example, bit map data to be outputted. According to this apparatus, a judgment is made upon each element of image data to be stored into the memory as to whether a value concerning the processing quantity of conversion from the first data format to the second data format exceeds a predetermined threshold or not. When the judgment result is affirmative, each element is stored, not in the first data format but in the second data format, into the memory.

Here, as the value concerning the processing quantity of conversion of the data format, there can be employed, for example, the drawing area of each element designated by the intermediate code of each element.

According to this invention, for example, in an image forming apparatus in which intermediate codes stored in the memory are converted into bit map data to be displayed or printed out, the quantity of work for conversion from the intermediate codes to the bit map data at the stage of displaying or printing-out decreases so that error caused by the lag of this work can be reduced.

In an apparatus according to a fifth aspect of the present invention, securing a free area of a sufficient capacity is attained by compression of image data when there is the possibility of shortage of the free area of the memory for storing the image data. When shortage of the free area is, however, not eliminated still by the compression, one data format is selected from a plurality of data formats different in expected compressibility so that the original data format of the image data is converted into the selected data format. The thus converted image data is compressed again, so that securing a free area of a larger capacity than the previous capacity is attained. The data format conversion and the data compression are repeated until the free area of a sufficient capacity can be secured. In the repetition, the conversion of data format is performed stageously so that expected compressibility is increased by one rank compared with the previous expected compressibility.

Here, as the plurality of data formats, there can be employed various kinds of bit map data different in spatial frequency, for example, in one or both of longitudinal and transverse directions with respect to a two-valued image such as a character, a line drawing, or the like. Further, with a multi-gradation image such as a photograph, there can be employed, for example, various kinds of bit map data different in the number of expressible gradations. Further, it is preferable that the plurality of data formats are within a range where distinction on real image among the various data formats substantially cannot be recognized by naked eyes. Further, it is preferable that the various data formats are equal to each other in formal resolution.

According to this apparatus, when there is the necessity of compressing image data because of shortage of the free memory area, the original image data is, first, converted into data of a compressible format and the data of the compressible format is compressed. If there is shortage of memory still as a result, the data is converted into other data of another data format capable of obtaining higher compressibility and the other data is compressed. If shortage of memory cannot be eliminated still, conversion into another data format to obtain further higher compressibility is made and the data is compressed. Such a series of operations can be repeated. That is, there is performed stageous adjustment of compressibility in which the original image is converted, at first, into a data format to obtain the lowest compressibility so that the data is compressed, and in which the original image is then gradually converted into a data format to obtain higher compressibility so that the data is compressed. When the free memory area of a sufficient capacity is secured at a certain stage, success of compression is judged at the stage so that compression with higher compressibility than necessary is prevented. Accordingly, lowering of picture quality caused by data conversion can be suppressed to minimum requirement.

The present invention further provides a method of storing image data into a memory, as executed by the aforementioned apparatus.

Although the apparatus and method of the present invention are adapted preferably to an image forming apparatus such as a printer or a display, it is not limited thereto and can be applied to various fields in which image processing must be performed under a memory having a limited size.

BRIEF DESCRIPTION OF THE DRAWINGS

FIGS. 5(A)–5(C) are diagrams showing classification of intermediate codes by the form of development;

DETAILED DESCRIPTION OF THE PREFERRED EMBODIMENTS

Figure 1:
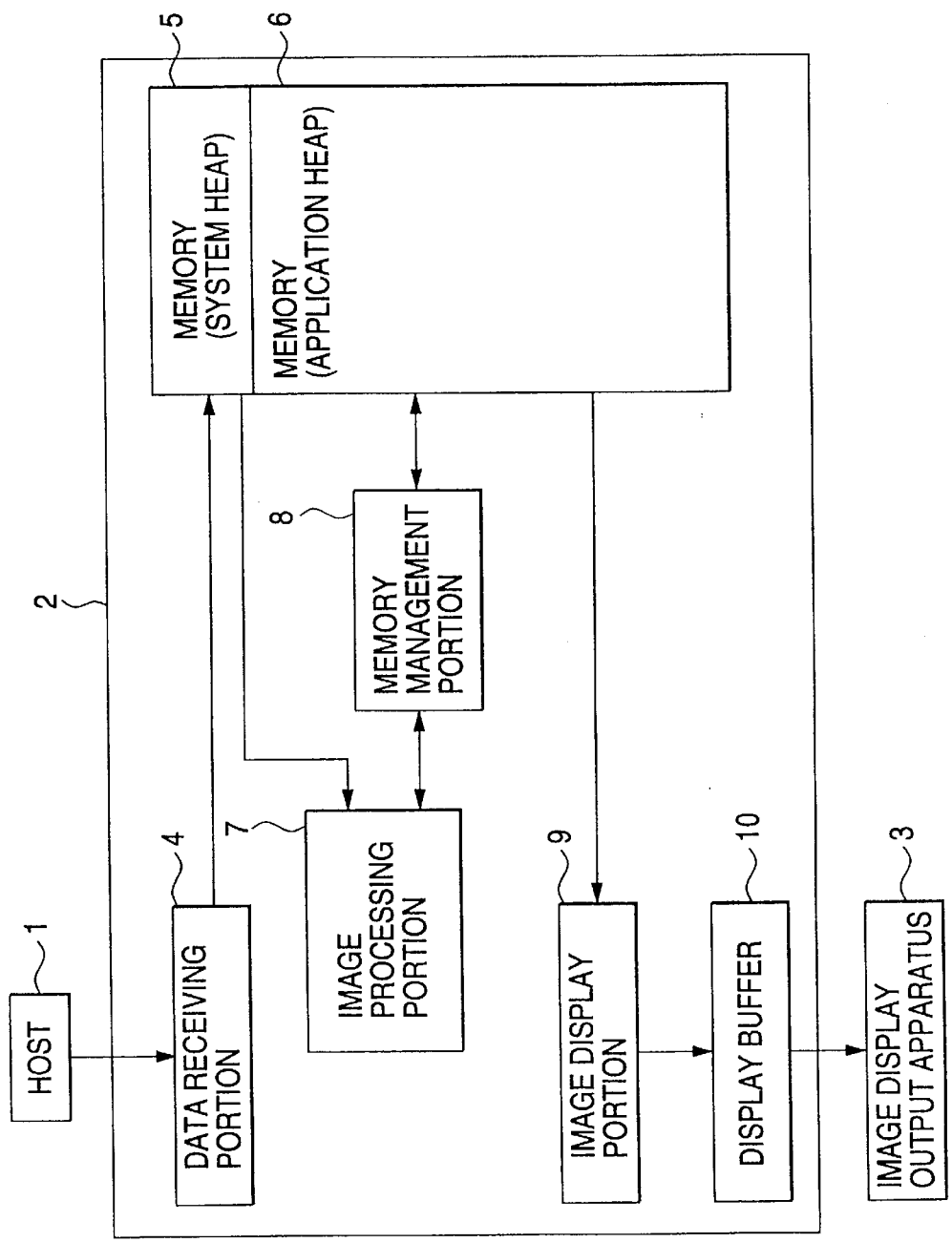
FIG. 1 is a functional block diagram of a conventional image data processing system.
Figure 2:
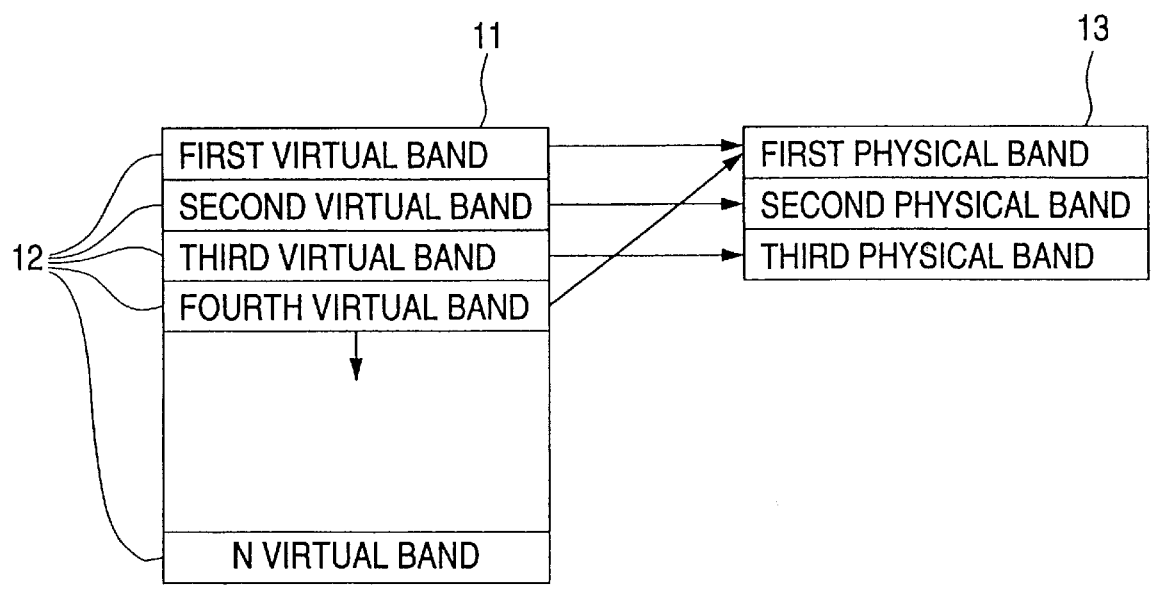
FIG. 2 is a diagram for explaining the concept of band type processing in the first embodiment of the present invention.

FIG. 2 is a diagram for explaining the outline of a system in which processing is performed after one page is partitioned into bands, in an embodiment of a print information processing apparatus according to the present invention.

One-page's printing paper 11 is divided into N virtual bands 12 so that these virtual bands 12 are successively processed by using a plurality of physical bands 13 on a RAM. Here, the number of physical bands is made 3, judging from the optimality of processing efficiency. The reason is that three physical bands are optimal for performing virtual band processing efficiently without waiting time and for avoiding redundant memory consumption.

Figure 3:
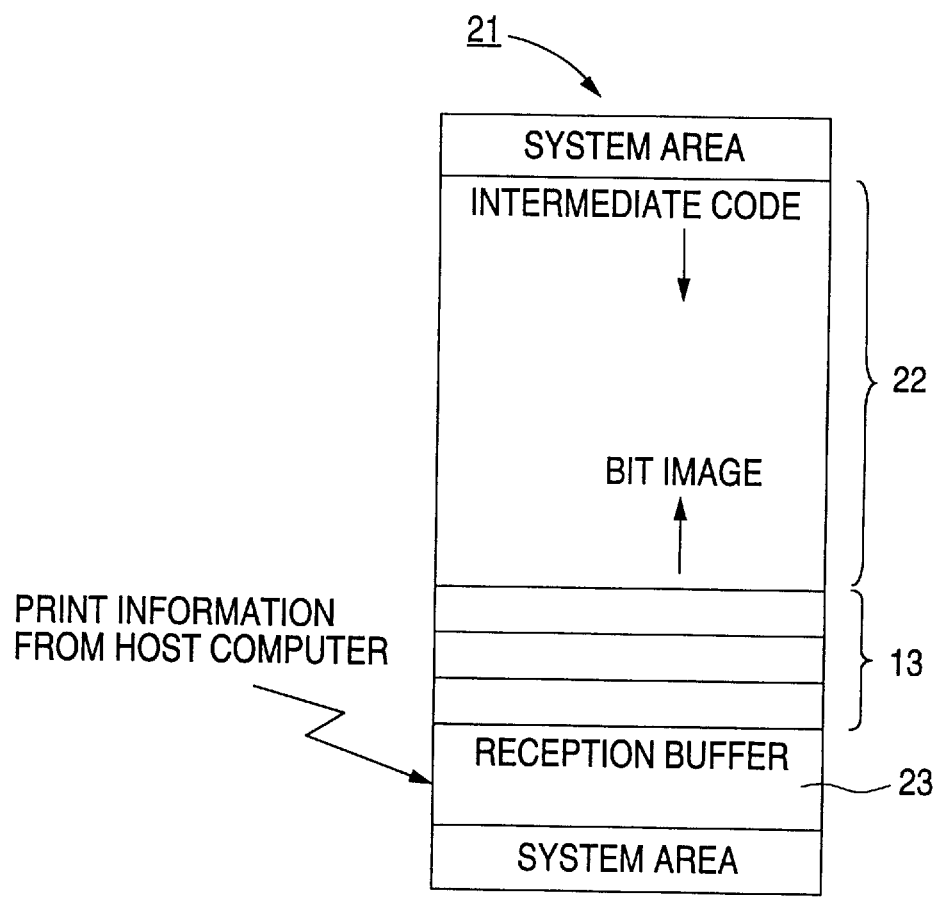
FIG. 3 is a diagram showing the inside structure of an RAM in the same embodiment.

FIG. 3 shows a map for use of the RAM in this embodiment. An area for the physical bands 13 is provided so as to be separated from an area for work memory 22. Further, a reception buffer 23 for receiving print information from a host computer is secured as another area on the RAM.

Figure 4:
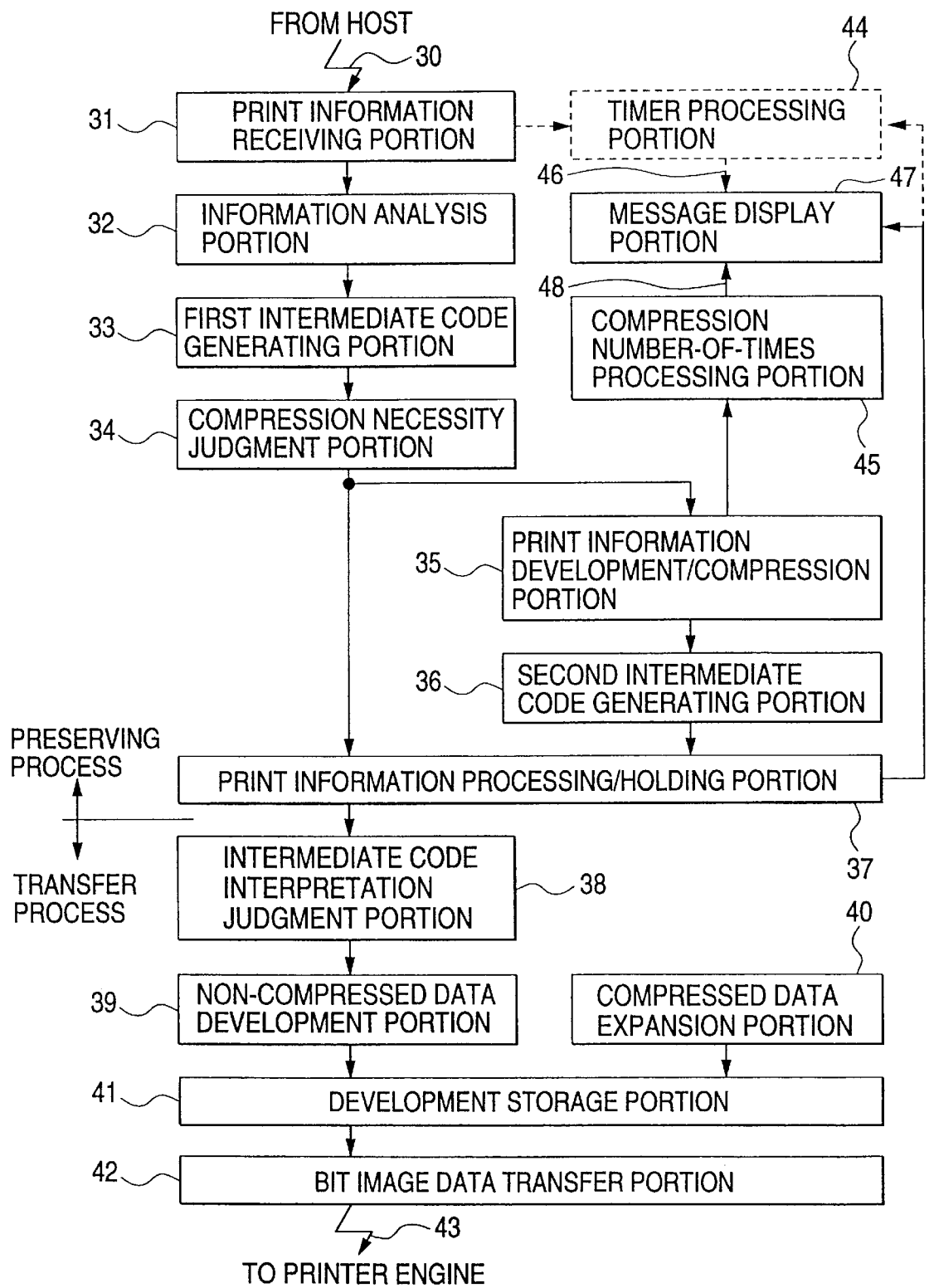
FIG. 4 is a diagram showing the configuration of the same embodiment.

FIG. 4 shows the functional configuration of this embodiment. A flow of processing of print information 30 in a certain virtual band as a subject to be processed will be described with reference to this drawing.

Assume now that the virtual band contains character data such as "ABC", etc., graphic data expressed in a bit image, and graphic data expressed in vector. When, for example, character data "A" is given from an input portion such as a keyboard, etc., print information 30 delivered from the host through a communication line contains a value of ASCII code "41", an output position, a size, etc. On the contrary, in the case of graphic data expressed in a bit image, such print information 30 contains bit composition information, output position, size, etc., and in the case of graphic data expressed in vector, such print information 30 contains numerical formulae, drawing position, size, etc. Therefore, these parts of print information 30 are received by the reception buffer 23 constituting a print information receiving portion 31 and stored in the reception buffer 23.

Then, the information concerning the kind, characteristic, printing position, etc., of the print information 30 is analyzed by an information analysis portion 32 on the basis of the print information 30 fetched by the print information receiving portion 31, so that intermediate codes are generated by a first intermediate code generating portion 33 on the basis of the analysis result. The intermediate codes are index data in which information such as the kind of the print information 30, the storage position of data necessary for drawing, the position of drawing in page, etc., is held in a predetermined format defined by the kind thereof.

FIG. 5 shows various intermediate code formats. Although intermediate code formats are classified into five or more kinds by the form of development, only three kinds of intermediate code formats are shown here as typical examples. Any intermediate code has a code name (CN) 51, in its first place, indicating the kind of information. The code name 51 contains information concerning the source type for discriminating the type of the source data among a 16-bit word type, an 8-bit byte type and a mixture type, and information concerning development type as shown in the drawing.

A standard type shown in FIG. 5(A) at least has a source pointer (SP) 52 indicating a source storage position, and an object pointer (OP) 53 indicating a destination position, and further has information of an object width (OW) 54 and an object height (OH) 55 when scale-up/down is applied to the source data. One intermediate code has about 60 bytes.

A straight line type shown in FIG. 5(B) shows an intermediate code applied to graphic data expressed in vector. The intermediate code has no source pointer 52 because source information is certain to be linear. All the vector graphic data are expressed by straight lines in the raster direction, so that an intermediate code corresponding to each straight line is generated.

A compressed type shown in FIG. 5(C) shows an intermediate code generated to manage one virtual band when the virtual band is developed into a bit image and compressed. The intermediate code contains SP 52 indicating the storage position of the compressed bit image, OP 53 indicating the destination position, and OW 54 indicating a gap for a continuous data group expanded.

By managing the analyzed print information 30 through generating the thus classified intermediate codes, it becomes possible to use a very small memory capacity in order to hold and process the print information 30 simply. In a process in which the print information 30 is processed, a judgment is first made as to which band of the N virtual bands contains information to be processed, so that an intermediate code of a predetermined format is generated in the thus located virtual band and stored in a print information processing/holding portion 37. The print information processing/holding portion 37 is specifically realized by a RAM and it is a portion of the work memory 22 in FIG. 3. In this occasion, the following three conditions are checked by a compression necessity judgment portion 34 at any time. At a point of time when any one of the conditions is satisfied, the situation of processing is made to branch to a print information development/compression portion 35 on the basis of a decision that data subjected to processing needs to be compressed.

(1) A condition in which the total memory capacity exceeds the size of one band buffer in a process in which only intermediate codes are generated for one virtual band;

(2) A condition in which the total memory capacity exceeds the size of one band buffer in a process in which intermediate codes and compressed bit images are generated for one virtual band; and (3) A condition in which the number of specific intermediate codes requiring relatively long time for development exceeds a predetermined reference value in a process in which intermediate codes are generated for one virtual band.

When, for example, 2-byte code characters "ABC" are inputted without fancy decoration as the print information 30, word type standard type code name 51 is described and then coordinates indicating a position for development in one page and addresses on a ROM where bit maps of character fonts "A", "B" and "C" are stored are written after the code name 51. Then, these intermediate codes are held successively by the print information processing/holding portion 37. In this case, a decision is made that compression is not required and the situation goes to the processing of the next print information 30.

However, if a large quantity of character information is contained or if a large number of intermediate codes are contained in the virtual band to be processed, information for the virtual band in question is fed to the print information development/compression portion 35 because the necessity of compression is judged from the reason that the capacity of all intermediate codes in one virtual band exceeds the capacity of a developed bit image or the reason that a very long processing time is required for development thereafter though there is no problem in capacity.

In the print information development/compression portion 35, intermediate codes already generated for a virtual band to be processed are developed into bit images and further, the print information 30 thereafter is developed directly into bit images without generation of any intermediate code. At a point of time when all information in the virtual band is developed into bit images, compression is performed by a predetermined compression method. When, for example, a run-length compression method is used, compression is made as follows.

Original Data 00111111

Compressed Data 0216

This is generally expressed as {xN} in which x represents a numerical value of data, and N represents the number of repetitions. Data generated by compression is compressed bit image data.

Then, an intermediate code for managing the compressed bit image data is generated by a second intermediate code generating portion 36. This intermediate code is of a compressed type shown in FIG. 5(C), so that only one intermediate code is generated in order to manage this virtual band.

Incidentally, when bit map images and characters are mixed into the same band buffer as shown in this drawing, the following two processing methods are thought of but the method (1) is preferred because it is important to prevent the work memory 22 from being used as frequently as possible.

(1) A method in which one virtual band mixedly containing character data and graphic data is entirely developed to bit images so that the bit images are compressed to be managed by one intermediate code (in this method, the memory for compressed data on the work RAM is required to be large in capacity but the memory for the intermediate codes can be relatively small in capacity); and (2) A method in which, in one band buffer mixedly containing character data and graphic data, only intermediate codes requiring a long time for development and intermediate codes requiring a large capacity are selectively developed to bit images and compressed whereas the other information is managed in a state of intermediate code (in this method, the capacity of the work memory 22 for compressed data is relatively small but the capacity of the memory for intermediate code is required to be relatively large).

As a method of writing the data into the work memory 22, there is thought of a method in which intermediate codes are written, for example, in ascending order from the lowest address number of the work memory 22 whereas compressed bit images are written, for example, in descending order from the highest address number as shown in FIG. 3. In this occasion, other processes such as development or the like may be performed in an intermediate region which has not been used yet.

Incidentally, it is a matter of course that the efficiency of use of the memory can be improved more greatly by selecting the compression method correspondingly to the kind of data.

The print information 30 delivered through the communication line by the processing up to now is processed on the RAM of the print information processing/holding portion 37, and necessary data are converted into intermediate codes or compressed bit images and stored. Thus, a preserving process is completed. At a point of time when the preserving process for one-page's print information 30 is completed, the preservation of all intermediate codes in one page and of compressed bit images corresponding to necessity is completed. Thereafter, the bit images are transferred to the printer engine by a process which will be described later. While the bit images are transferred, the preserving process for the next page is carried out by using a free area of the RAM. At a point of time when the transfer of one page to the printer engine is completed, the next page is transferred. While the next page is transferred, the preserving process for the secondary next page is further carried out. In this manner, rotation is made efficiently.

During the preserving process, the number of times by which conversion into compressed bit images (hereinafter referred to as "compression process") is made in each page is counted by a compression number-of-times processing portion 45. That is, the compression number-of-times processing portion 45 counts the number of times by which the print information development/compression portion 35 carries out a process of developing intermediate code or print information to bit images and compressing the bit images, for each page in the preserving process thereof (that is, the number of times is the number of character/graphic data, or the like converted into compressed bit images and hereinafter referred to as "compression number-of-times"). When the count value of the compression number-of-times in each page then reaches a predetermined threshold, the compression number-of-times processing portion 45 outputs a count-up signal 48 to a message display portion 47.

When the count-up signal 47 is outputted from the compression number-of-times processing portion 45, this means the fact that a very long time is required for the preserving process because the number of times of compression per page is very large. One main cause of such very long processing time is that the band buffer 13 or work area 22 of a sufficient capacity which is required to convert all data of one page into intermediate codes and to hold all the data cannot be secured because of the small capacity of the RAM. To eliminate this main cause, it may extend the RAM. When the count-up signal 47 is now outputted from the compression number-of-times processing portion 45, the message display portion 47 displays a predetermined message on a liquid crystal display of the printer, a display of the host computer, or the like. This message serves to tell the user that the RAM is preferably required to be extended in order to provide a comfortable printing environment. For example, the message is as follows: "This printing will take a very long time. Extension of RAM is required for shortening the time."

This message display is made at a time suitable for calling the user's attention and continued for a suitable period. For example, there can be employed a method in which this message is displayed only for a predetermined period when the count-up signal 47 is outputted, a method in which this message is continuously or intermittently displayed in a period of from a point of time when the count-up signal 47 is once outputted to a point of time when the preservation or printing of the page is completed, a method in which this message is continuously or intermittently displayed up to the completion of printing of the whole document, or the like.

Incidentally, as another structure for displaying this message, a timer processing portion 44 as represented by the broken line in FIG. 4 may be provided instead of or in addition to the aforementioned compression number-of-times processing portion 45. This timer processing portion 44 starts time counting concerning each page at a point of time when print information 30 in each page enters the print information receiving portion 31, and this timer processing portion 44 continues the time counting concerning each page until the preserving process for each page is completed. If the time count value reaches a predetermined threshold when the time counting is continued, a time-up signal 46 is outputted to the message display portion 47. Upon reception of this time-up signal 46, the message display portion 47 displays the aforementioned message by the aforementioned suitable method in the same manner as in the case of reception of the count-up signal 47.

A process in which intermediate codes and compressed bit images preserved as described above are developed to bit images and transferred to the printer engine will be described below.

An intermediate code interpretation judgment portion 38 reads the intermediate code name 51 and interprets first whether the data is compressed data or not. When the data is not compressed data, the data goes to a non-compressed data development portion 39. When the data is compressed data, the data goes to a compressed data expansion portion 40.

The non-compressed data development portion 39 develops a certain source data into a bit image on the basis of intermediate code management information contained in the virtual band to be processed, and writes the bit image in a development storage portion 41. Specifically, it writes the bit image in a designated position of a predetermined physical band 13 on the RAM. The thus generated bit image of the virtual band has one-to-one correspondence with respect to the resolution of the printer engine which is used when the bit image is outputted. At this time, distinction among character data, vector graphic data and bit image graphic data is eliminated.

On the other hand, the compressed data expansion portion 40 expands the compressed bit image preserved on the RAM of the print information processing/holding portion 37 by a predetermined expansion method and writes the expanded bit image in the physical band 13 of the development storage portion 41 on the basis of intermediate code management information contained in the virtual band to be processed. Of course, the thus generated bit image of the virtual band also has one-to-one correspondence with respect to the resolution of the printer engine which is used when the bit image is outputted.

Through the aforementioned process, all the parts of print information 30 in the virtual band to be processed are written in the physical band 13 of the development storage portion 41, so that all the parts of print information 30 are quickly outputted to the printer engine of the printer by a bit image data transfer portion 42 when they are collected.

By the above description, intermediate codes and compressed bit images preserved on the RAM are converted into bit images, and the bit images are transferred to the printer engine. Thus, a transfer process is completed.

Figure 6:
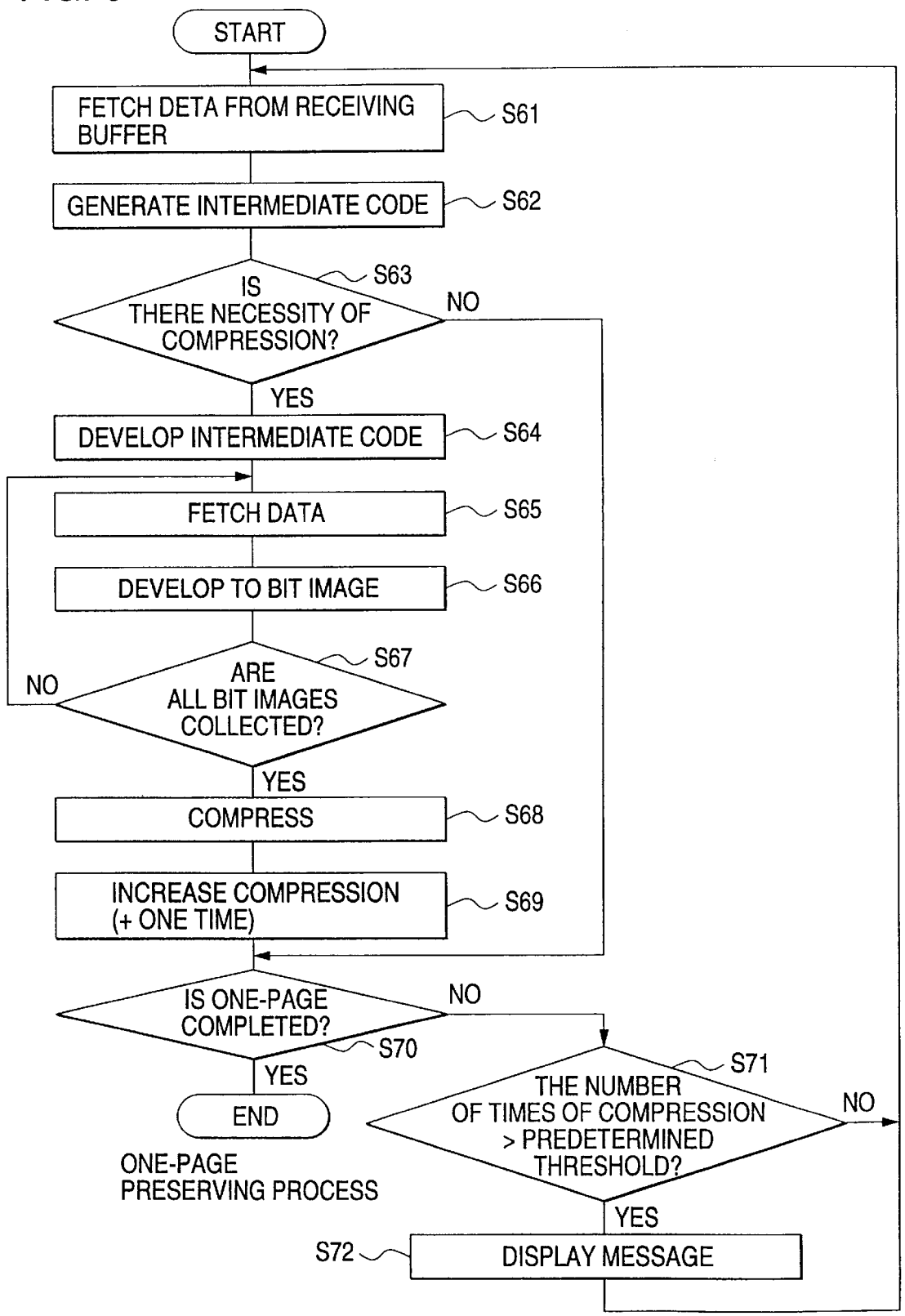
FIG. 6 is a flow chart showing a process of preserving one-page's print information 300 in the same embodiment.

FIG. 6 is a flow chart of the preserving process showing a flow of preservation of one-page's print information 30 into the work memory 22 in this embodiment.

All the parts of print information 30 delivered from the host are successively received in the receiving buffer 23 on the RAM (S61). Then, all the parts of information from the receiving buffer 23 are successively fetched into the work memory 22 by the information analysis portion 32 in order to generate intermediate codes (S62). If there is necessity of compression in the process of generating intermediate codes (S63), all the intermediate codes already generated for the virtual band in question are first developed into bit images in the work memory 22 (S64) whereafter the residual parts of print information 30 of the virtual band in question are fetched from the receiving buffer 23 (S65) and developed to bit images directly on the work memory 22 without conversion into intermediate codes (S66).

When all the bit images for the virtual band are collected, the bit images are compressed and preserved in the work memory 22 (S68). In this occasion, the number of times of compression is increased by one whenever one character, graphics, or the like, is compressed (S69). The number of times of compression at this time is counted up. When the compression/preservation of bit images for the virtual band in question is completed, print information 30 for the next virtual band is received from the receiving buffer 23 on the RAM again.

When the number of times of compression exceeds a predetermined threshold before the one-page preserving process is completed (S70 and S71), the aforementioned message is displayed.

Figure 7:
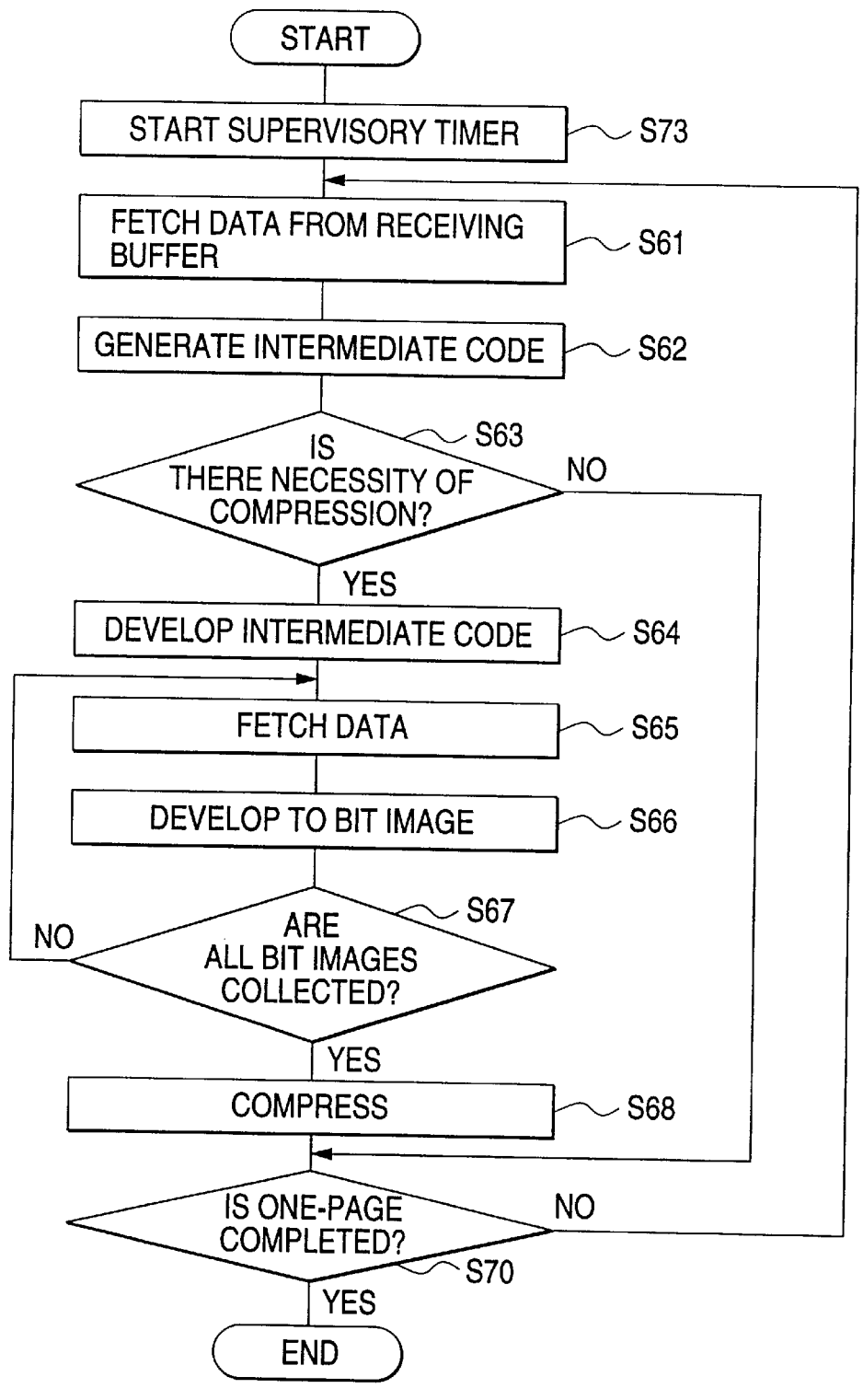
FIG. 7 is a flow chart showing a modified example of the process of preserving one-page's print information 300 in the same embodiment.
Figure 8:
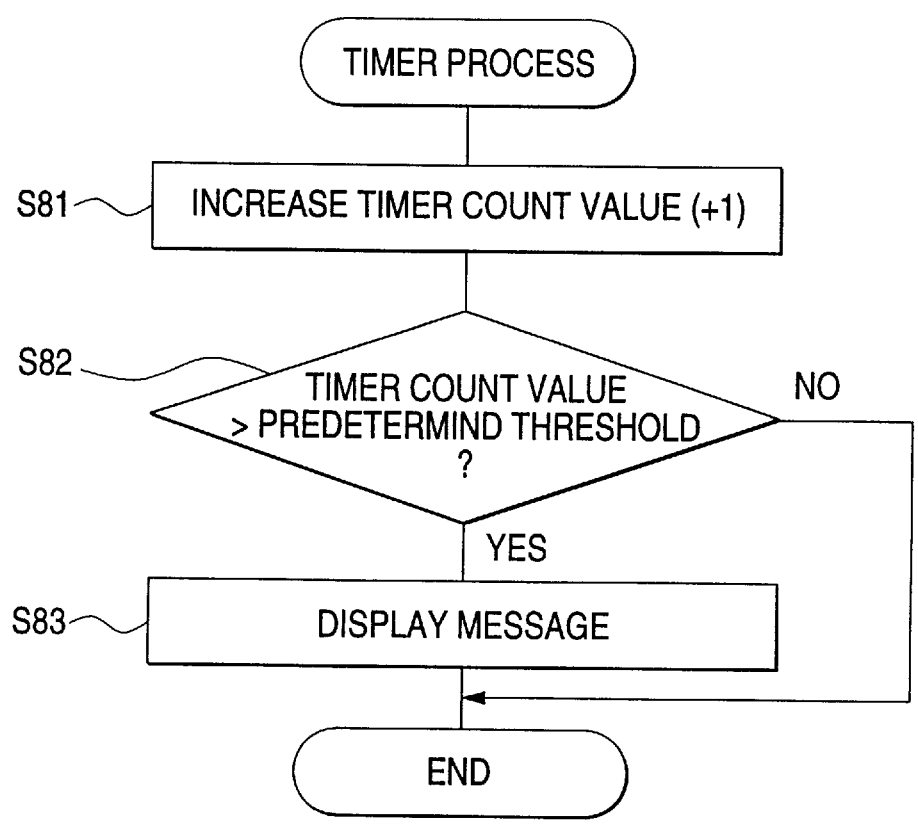
FIG. 8 is a flow chart showing a timer process in the same modified example.

FIGS. 7 and 8 show a flow of the one-page preserving process in the structure in which a judgment is made by the timer processing portion 44 as to whether the message display is to be made or not.

In this case, as shown in FIG. 7, a supervisory timer is started at a point of time when the input of one-page's print information from the host is started (S73). Then, the same preserving process as described above in the case of FIG. 6 is started, so that the supervisory timer operates until the one-page preserving process is completed. The supervisory timer generates an interruption signal periodically so that the timer process shown in FIG. 8 is carried out on the basis of this interruption. In the timer process, the timer count value is increased (S81), so that when the count value reaches a predetermined threshold (S82), the aforementioned message is displayed (S83).

As described above, in this embodiment, in a process in which one-page's print information is converted into intermediate codes or converted into compressed bit images, as the occasion demands, and in which the intermediate codes or compressed image bits are preserved on the RAM, the number of times of compression or the processing time is monitored to thereby judge whether the capacity of the RAM is sufficient or not. Thus, when the capacity of the RAM is insufficient, the message is outputted to give the user a proposal for extension of the RAM. The user can determine freely whether this proposal is neglected or not. If this message is displayed frequently, this means the fact that the capacity of the RAM is insufficient for the general use condition of the user. Accordingly, by extending the RAM according to the proposal, the opportunity of compressing bit images is reduced so that the printing process can be completed in a shorter time than the conventional case. Accordingly, it is easy for the user to adjust the memory capacity of the printer so as to be suitable for the use condition of the user.

Incidentally, in the aforementioned embodiment, various modifications can be made in a range without departing from the gist of the present invention. For example, as the form of storage of print information into the memory, there can be employed not only the form of intermediate codes and compressed bit images for band unit as in the aforementioned embodiment but also the form of intermediate codes and compressed bit images for each page, the form of bit images and compressed bit images, or the like.

A second embodiment of the present invention will be described below.

Figure 9:
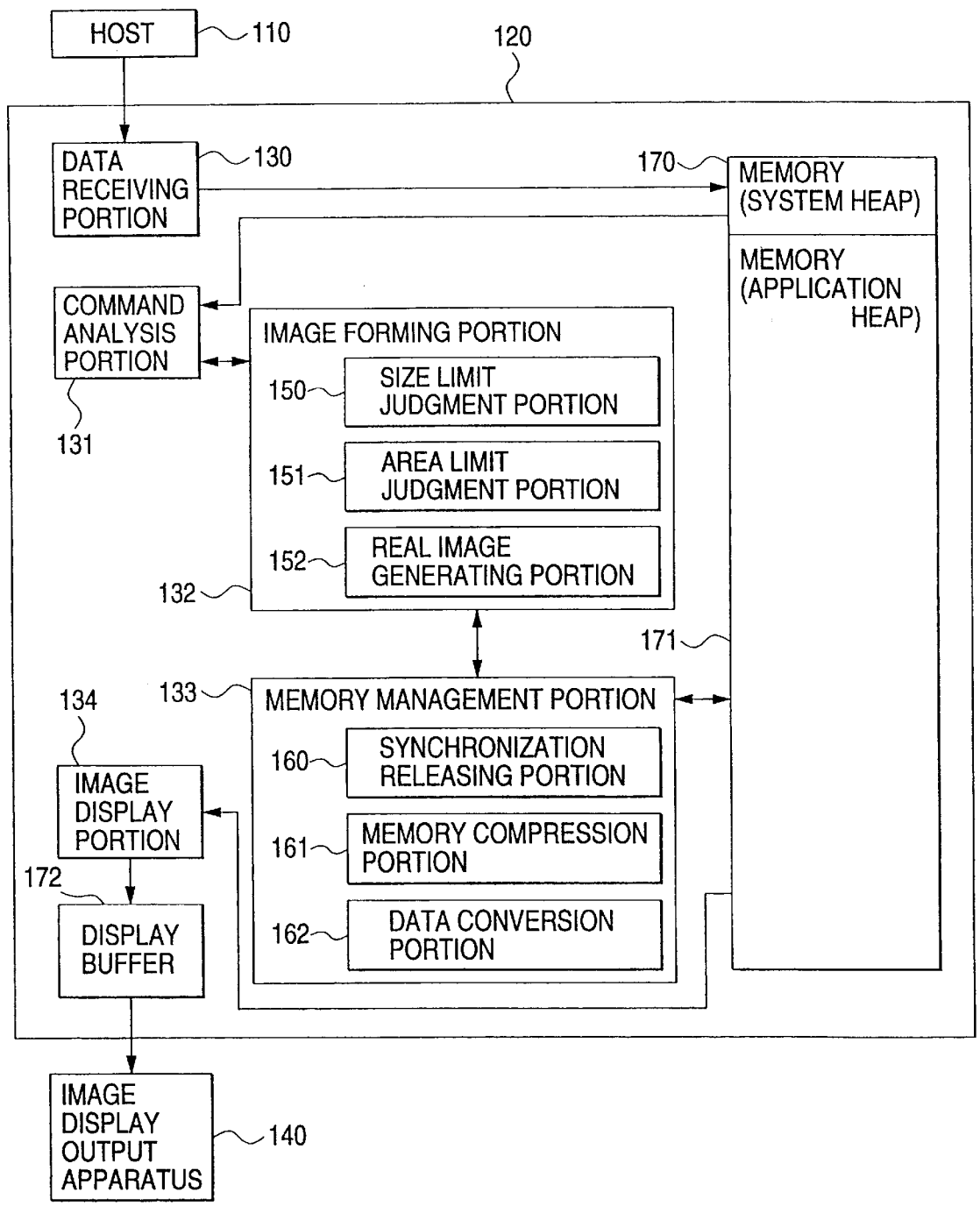
FIG. 9 is a block diagram showing the overall configuration of a second embodiment of the present invention.

FIG. 9 shows the overall configuration of the second embodiment of the present invention.

As shown in FIG. 9, this system comprises a host apparatus 110, an image forming apparatus 120, and an image display output apparatus 140. Incidentally, in a general computer system, the host apparatus 110 is, for example, a personal computer, the image forming apparatus 120 is a control circuit in the inside of a printer or a circuit for outputting a signal to a display, and the image display output apparatus 140 is a print engine of a printer or a display.

The image forming apparatus 120 includes a data receiving portion 130, a command analysis portion 131, an image forming portion 132, a memory management portion 133, an image display portion 134, a memory 170 as a system heap, a memory 171 as an application heap, and a display buffer 172.

The image forming portion 132 has a size limit judgment portion 150, an area limit judgment portion 151, and a real image generating portion 152. The memory management portion 133 has a synchronization releasing portion 160, a memory compression portion 161, and a data conversion portion 163.

Functions of the respective portions will be described below.

The data receiving portion 130 receives data from the host apparatus 110 and stores the data in a receiving buffer provided in the memory 171. The command analysis portion 131 reads the data stored in the receiving buffer, analyzes the data and feeds a corresponding drawing request to the image forming portion 132. Incidentally, the drawing request is constituted by a series of function calls for calling various drawing functions possessed by the image forming portion 132.

The image forming portion 132 divides one page as a subject of processing into a plurality of bands and converts the drawing request from the command analysis portion 131 into an intermediate code for each band. The intermediate code is checked by the size limit judgment portion 150 and the area limit judgment portion 151 before the intermediate code is registered into the memory 171 through the memory management portion 133.

The size limit judgment portion 150 judges whether the data size of the intermediate code in each band exceeds the data size of a real image or not. The judgment is made by comparing the data size of the intermediate code with a threshold which is set in advance. Incidentally, as the threshold, there is used, for example, a value obtained by multiplying by a predetermined coefficient a value obtained by dividing the maximum block size of the page as a subject of processing by the number of bands.

The area limit judgment portion 151 judges whether there is the possibility that image formation results in failure (overrun error) because the conversion (drawing process) of the intermediate code into the real image by an image display portion 134, which will be described later, is too late for the image forming operation of the image display output apparatus 140. This judgment is made by comparing the drawing area designated by the intermediate code with a limit area which is calculated in advance as an area in which image formation does not result in failure. Here, the limit area means an area in which drawing with respect to a certain band can be made in a predetermined time. Incidentally, this area is a drawing area in which all procedures of logic operation, shift process, mask process and scale-up process, etc., for example, as obtained from an evaluation function which is obtained correspondingly to each intermediate code, can be executed in a drawing time allowed for the development of one band.

When the results of judgments by the size limit judgment portion 150 and the area limit judgment portion 151 show that the data size of the intermediate code does not exceed the data size of the real image and there is no possibility of overrun error, the intermediate code is directly registered into the memory 171 by the memory management portion 133. On the other hand, when the data size of the intermediate code exceeds the data size of the real image or when there is the possibility of overrun error, the intermediate code is delivered to the real image generating portion 152. The real image generating portion 152 converts the intermediate code into a complete bit map format real image data (hereinafter this conversion is referred to as "beforehand development"). The beforehand developed real image data is registered into the memory 171 by the memory management portion 133.

The memory management portion 133 registers the intermediate code generated by the image forming portion 132 or the beforehand developed real image data in the memory 171. For this registration, the memory management portion 133 tries to search the memory 171 for a free memory area of a capacity required for the registration and to secure the free memory area. If the free memory area can be secured successfully, the registration is made normally. If the free memory area of a sufficient capacity cannot be secured, however, the synchronization releasing portion 160 in the memory management portion 133 is called out.

The synchronization releasing portion 160, which is started when the free memory area cannot be secured, checks whether any data waiting for display on the image display output apparatus 140 exists in the memory 171 or not. If the result of checking makes a decision that there is any data, the data is released (erased from the memory 171) as displayed data to thereby increase the free memory area of the memory 171 at a point of time when the display on the image display output apparatus 140 is completed. On the contrary, when the result of checking makes a decision that there is no data waiting for display or when the free memory area of a sufficient capacity cannot be secured even though the displayed data is released, the memory compression portion 161 is called out next.

To develop beforehand on the memory 171 intermediate codes of each band stored in the memory 171, the memory compression portion 161 converts the intermediate codes into real image data and then the real image data is compressed to thereby increase the free memory area of the memory 171. When the sufficient increase of the free memory area cannot be obtained only by the compression of the real image data, however, the memory compression portion 161 calls out the data conversion portion 162 which will be described later, and delivers the real image data to the data conversion portion 162 to thereby make the data conversion portion 162 convert the real image data into data of a compressible format and then try to compress the data of the compressible format. As will be described later, the data conversion by the data conversion portion 162 is designed so as to be performed by a plurality of times while a plurality of conversion methods are used selectively. That is, conversion methods can be selected stageously so that compressibility is apt to be increased gradually whenever number of times increases.

Accordingly, the memory compression portion 161 first selects an initial stage data conversion method and tries to compress the data converted by the method. If as a result, the free memory area of the memory 171 can be secured, the memory compression portion 161 judges the success of compression and makes the compressing process completed. If as a result, the free memory area cannot be secured yet, the memory compression portion 161 selects the next stage conversion method higher in compressibility and tries to compress the data converted by the method. The operation of checking whether the free memory area can be secured or not, is repeated until the free memory area of a sufficient capacity can be secured.

However, if the free memory area still cannot be secured though the aforementioned operation is repeated up to the last stage conversion method, the memory compression portion 161 outputs to the command analysis portion 131 error indicating the fact that the free memory area cannot be secured.

Further, the memory compression portion 161 expands the compressed real image data in the memory 171 to the original intermediate code when the compressed real image data is displayed or printed or when the free memory area is increased so that there is no necessity of storing the real image data in the compressed form.

The data conversion portion 162 converts the real image data in the memory 171 into data of a compressible format when the data conversion portion 162 is requested by the memory compression portion 161. Conversion methods having a plurality of stages are prepared for the data conversion portion 162 so that compressibility is apt to be increased gradually. A conversion method designated by the memory compression portion 161 is selected therefrom.

Here, data of a compressible format means data of a format which has a repetition pattern appearing more frequently than the original data. Further, "conversion methods having a plurality of stages in which compressibility is apt to be increased gradually" means conversion methods having a plurality of stages in which the frequency of appearance of a repetition pattern increases gradually.

Specifically, for example, the following three conversion methods are taken with respect to a two-valued image such as a line drawing or a text.

(1) Reducing the spatial frequency only in the transverse direction of the image;

(2) Reducing the spatial frequency only in the longitudinal direction; and (3) Reducing the spatial frequency both in the transverse direction and in the longitudinal direction.

Incidentally, the aforementioned spatial frequency means fineness of a pattern of dots constituting an image, that is, the minimum number of pixels in which the dot pattern changes, or in other words, substantial resolution. By selecting conversion methods successively in such a manner that mesh is made large only in the transverse direction (or longitudinal direction)→mesh is made large only in the longitudinal direction (or transverse direction)→mesh is made large both in the transverse direction and in the longitudinal direction, data of formats in which the frequency of appearance of a repetition pattern increases gradually can be obtained stageously. Incidentally, the way of making mesh large, that is, the way of reducing spatial frequency may be made stageously so that one-pixel unit of the original image is changed to two-pixel unit, three-pixel unit, . . .

Incidentally, a point which should be noticed here is that the size of the image, that is, the longitudinal and transverse numbers of pixels, that is, formal resolution, must not be changed even in the case where the spatial frequency, that is, the substantial resolution is reduced. Assume now conversion is made so that the spatial frequency is reduced to ½ both in the longitudinal direction and in the transverse direction when, for example, the resolution of the original image is 600 dpi×600 dpi. In this case, the size of the image after conversion, that is, the formal resolution thereof is also 600 dpi×600 dpi whereas the changing step of the dot pattern in the image, that is, the substantial resolution of the image after conversion is two-dot unit (equivalent to 300 dpi) though that of the original image is one-dot unit.

On the other hand, as a conversion method having a plurality of stages with respect to a half-tone image such as a photograph, there is, for example, a method in which a plurality of half-tone dot patterns (see FIGS. 15 and 16) different in gradation are prepared in advance so that the original image data is converted into image data expressed in a half-tone dot pattern with designated gradation by stegeously and selectively using the plurality of half-tone dot patterns. This method will be described later in detail.

When the data conversion portion 162 converts the original real image data into data of a compressible format in the aforementioned manner, the data of a compressible format is fed to the memory compression portion 161 and compressed as described above.

The image display portion 134 band-by-band reads image data from the memory 171 and develops the image data into the form of real image data on the display buffer 172. If in this occasion, the image data are registered in the form of intermediate codes into the memory 171, the intermediate codes are read and converted into real image data and then the real image data are developed on the display buffer 172. If the image data are contrariwise registered in the form of real image data into the memory 171, the real image data are read and directly developed on the display buffer 172. If the image data are in the form of compressed data, the compressed data are expanded into real image data and developed on the display buffer 172. The real image data thus developed on the display buffer 172 are fed to an image display output apparatus 140 and displayed or printed out.

The functions of main parts in the aforementioned configuration will be described below more in detail.

Figure 10:
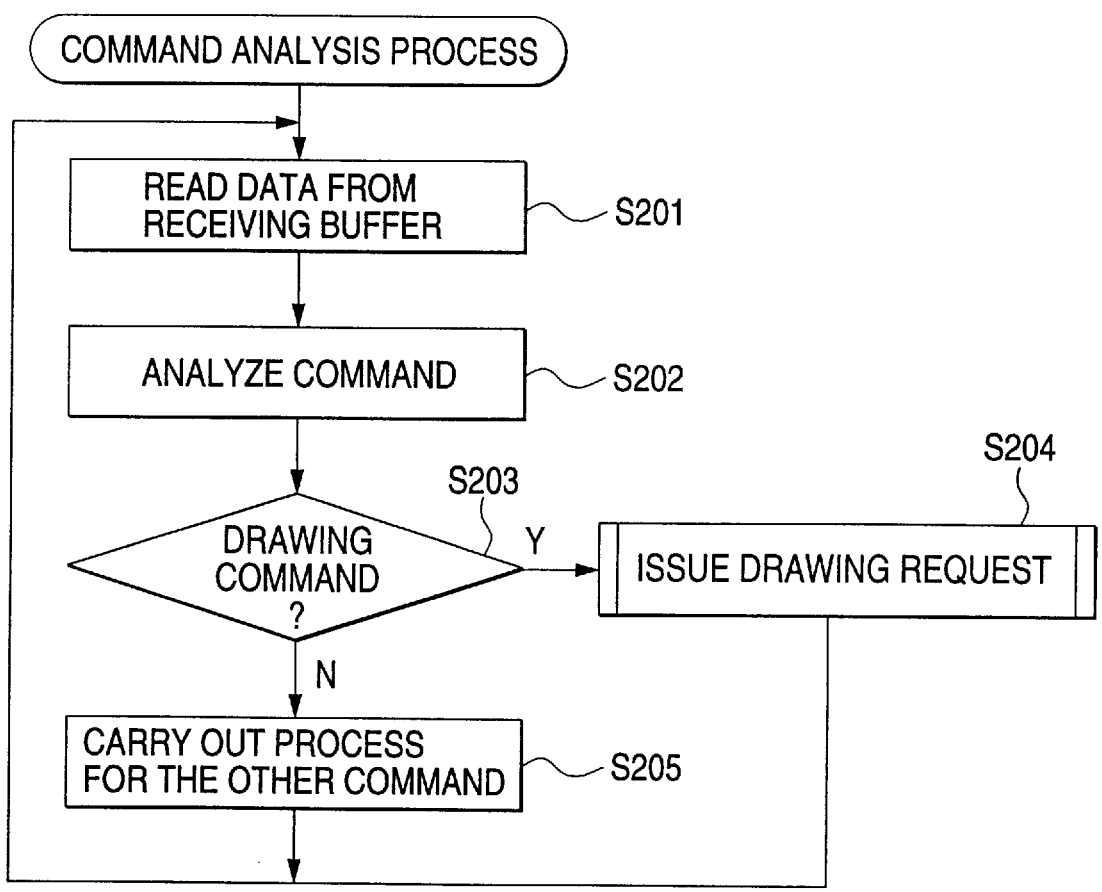
FIG. 10 is a flow chart of an analyzing operation in a command analysis portion.

FIG. 10 shows a flow chart of a command analysis process in the command analysis portion 131.

In FIG. 10, data are read first from the receiving buffer in the memory 170 (step S201) and each command delivered from the host apparatus 110 is analyzed (step S202). If the command is recognized to be a drawing command as a result of the analysis (step S203), a corresponding drawing request is issued to the image forming portion 132 (step S204). If the command is contrariwise recognized to be other than the drawing command as a result of the analysis in the step S202, a process corresponding to the command other than the drawing command is carried out (step S205).

Figure 11:
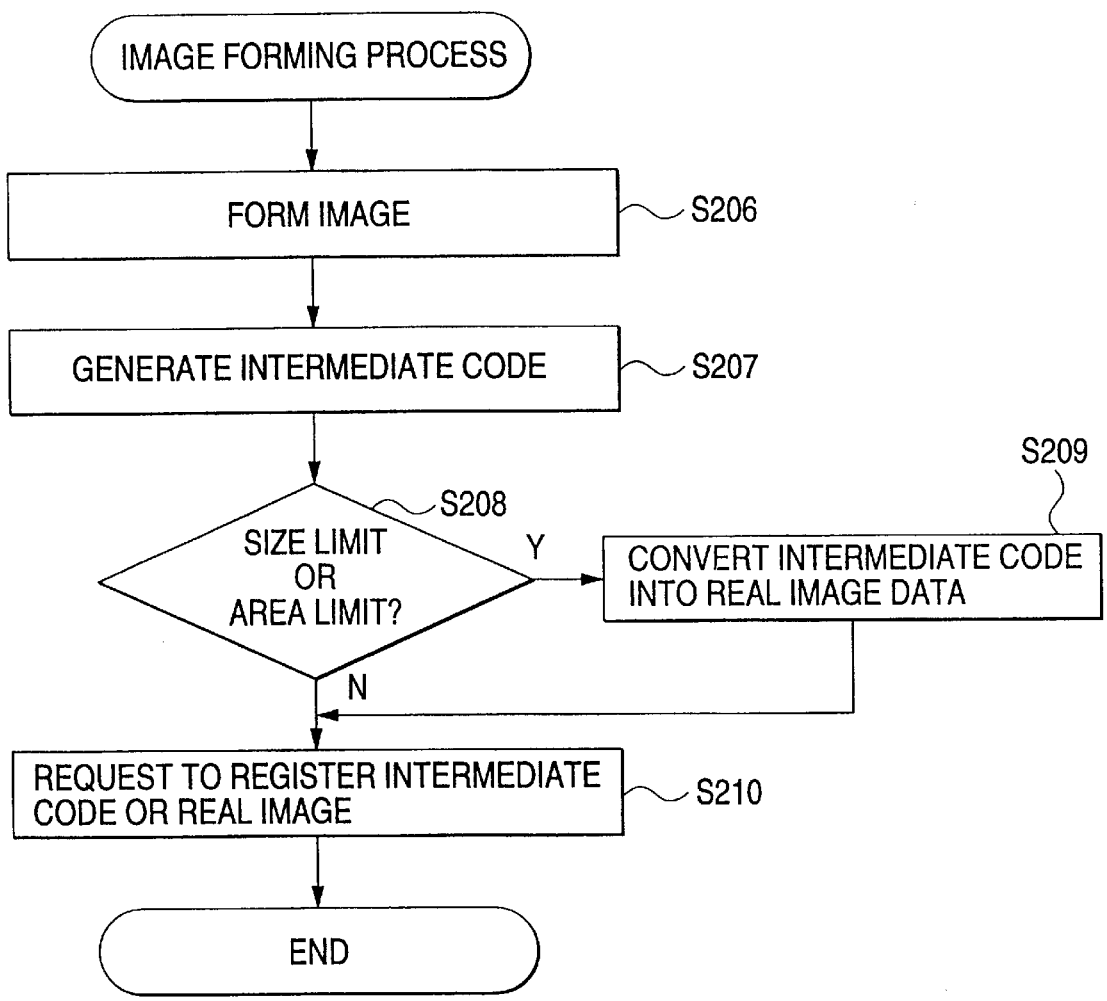
FIG. 11 is a flow chart of an image forming operation in an image forming portion.

FIG. 11 shows a flow chart of an image forming process in the image forming portion 132.

In FIG. 11, an image forming step for performing, for example, generation of a bit map of each character in text, calculation of position information of each character in page, calculation of pass data and position information of graphics, or the like, by using drawing functions band-by-band called out correspondingly to a drawing request from the command analysis portion 131, is first carried out (step S206). An intermediate code is generated on the basis of the result thereof (step S207).

Then, a judgment is made as to whether the data size of this intermediate code exceeds the data size of the real image data or not. If the result is negative, a limit area in which over-run error is avoided is calculated with respect to the intermediate code and then a judgment is further made as to whether the drawing area designated by the intermediate code exceeds the calculated limit area or not (step S208). As a result, if the data size of the intermediate code exceeds the data size of the real image or if the drawing area of the intermediate code exceeds the limit area, the intermediate code is converted into real image data (step S209) and the memory management portion 33 is requested to register the real image data into the memory 171 (step S210).

If the aforementioned judgment results are both negative, on the other hand, the memory management portion 133 is requested to register the intermediate code generated in the step S207 into the memory 171 directly (step S210).

Figure 12:
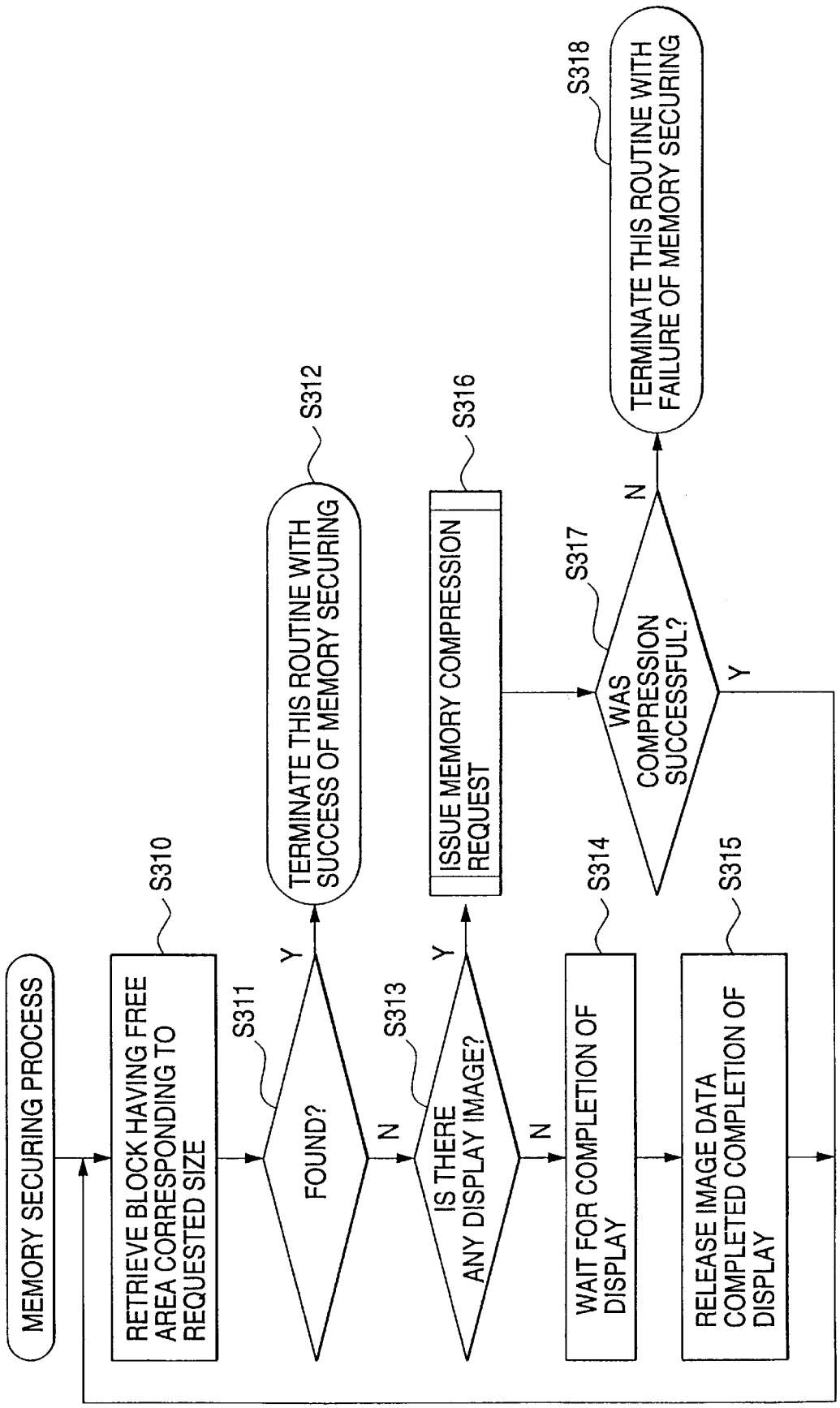
FIG. 12 is a flow chart of a memory securing operation in a memory management portion.

FIG. 12 shows a flow chart of a memory securing process in the memory management portion 133.

In FIG. 12, a block having a free area corresponding to the data size of the intermediate code or real image data to be registered is first retrieved from the memory 171 (step S310). If, as a result of the retrieval, a free area is found (step S311), a pointer of the free area is returned to the command analysis portion 131 to thereby make this routine terminated with success of memory securing (step S312).

As a result of the retrieval in the step S310, on the other hand, if any free area of the data size is not found, then a judgment is made as to whether the band (=display image) currently outputted to the image display output apparatus 140 is in the memory 171 or not (step S313). If there is any display image, the completion of display of the image is waited for (step S314), the image data the display of which has been completed is released (step S315) and then a retrial is made to secure a free area (step S310).

If a decision that there is no display image is made in the step S313, on the contrary, a memory compression request is issued to the memory compression portion 161 (step S316). If, as a result, memory compression is made with success, a retrial is made to secure a free area because there is a possibility that a free area is generated in the memory 171 (step S310). If memory compression is failed on the contrary, memory error is outputted to the command analysis portion 131.

Figure 13:
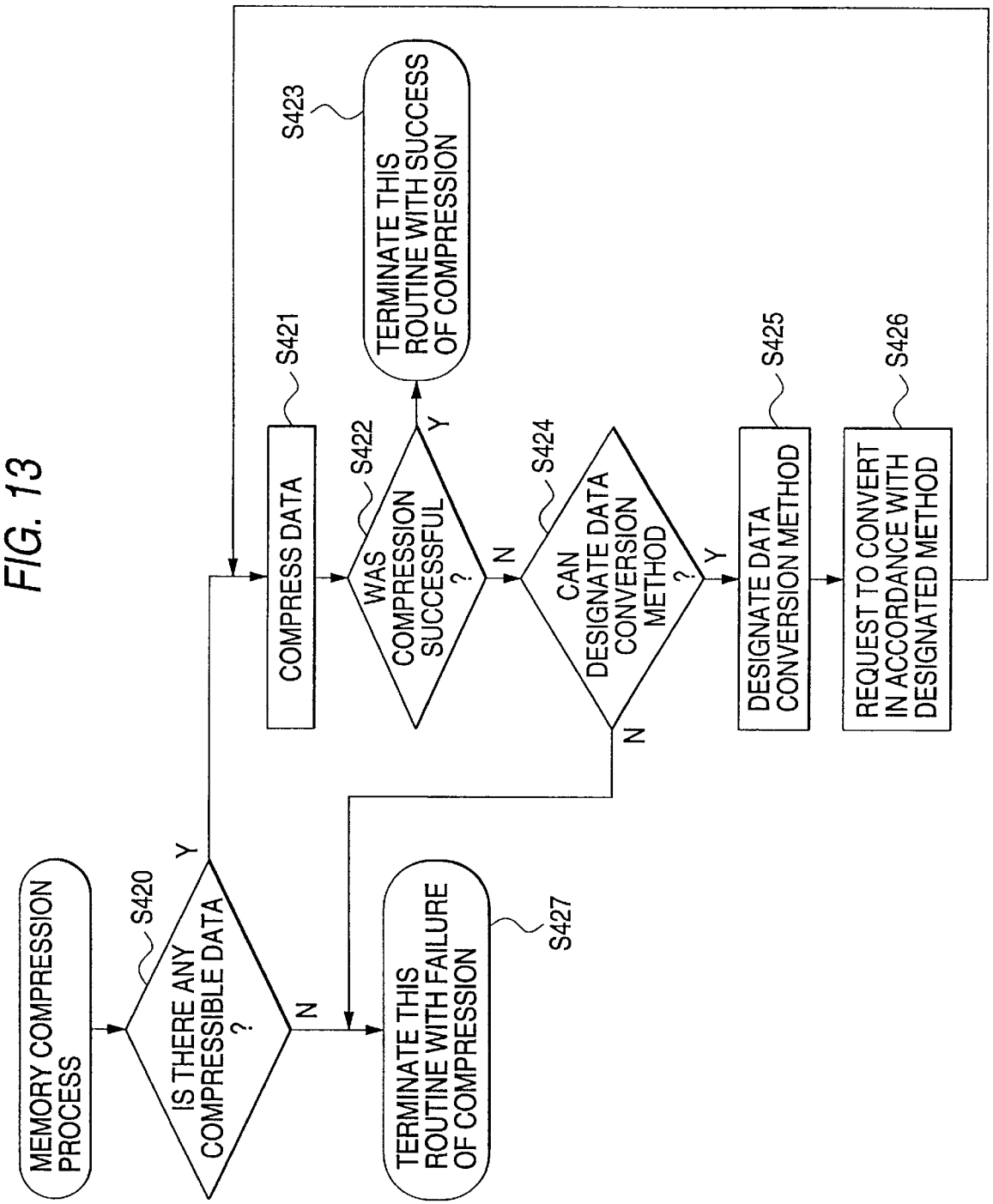
FIG. 13 is a flow chart of a memory compressing operation in a memory compression portion.

FIG. 13 shows a flow chart of a memory compression process in the memory compression portion 161.

In FIG. 13, first, a judgment is made as to whether there is any compressible data (that is, data converted from the intermediate code format into the real image in order to perform beforehand development on the memory 171) in the memory 171 or not (step S420). If, as a result of the judgment, a decision is made that there is any compressible data, the real image data (that is, original image data) is compressed (step S421). Then, a judgment is made as to whether the data compression of the step S421 resulted in success or not (that is, whether the free memory area could be secured or not) (step S422). If a decision is made that the data compression was succeeded, the command analysis portion 131 is informed that the data compression resulted in success (step S423).

If a decision is contrariwise made in the step S422 that compression resulted in failure (that is, the free memory area could not be secured), the original real image data is converted into data of a more compressible format and then the process for compression is restarted.

First, the data conversion portion 162 is called out and a judgment is made as to whether a data conversion method for conversion into a more compressible format can be designated or not (step S426). That is, because various kinds of methods for multistageous conversion are prepared as described above, a judgment is made as to whether among those various methods there is any method of a stage which has been not tried yet. Of course, the result of the judgment is YES at first. Therefore, a conversion method of an initial stage is first designated for the data conversion portion 162 (step S425) and the data conversion portion 162 is requested to convert the original image data by the conversion method (step S426). Then, the data converted by the data conversion portion 162 is received and compressed (step S421) and then a judgment is made as to whether this data compression resulted in success or not (step S422). When, as a result, the compression resulted in success, the command analysis portion 131 is informed that the compression resulted in success (step S423).

When the compression still resulted in failure, on the contrary, the situation of the routine goes to the step S424 again in order to perform compression after data conversion into data of a more compressible format. In the step S424. a judgment is made as to whether there is any data conversion method of the next stage or not. If there is any conversion method of the next stage, a request is made to convert the data by using the method, the thus converted data is tried to be compressed, and then a judgment is made as to whether the compression resulted in success or not (steps S425, S426, S421 and S422).

In this manner, the operation of compressing data after conversion of the original image data into a more compressible format is stageously repeated until the compression results in success, that is, until the free memory area can be secured. By this procedure, compressibility is increased stageously gradually. Particularly, in the case where the number of stages is very large, compressibility is increased substantially stagelessly. As a result, compression is made with necessary and sufficient compressibility, so that lowering of picture quality is suppressed to the necessary minimum requirement.

In the case where compression contrariwise still resulted in failure though compression was made after conversion by the data conversion method of the last stage, a decision is made in step S424 that it is impossible to designate any more conversion method, and then the command analysis portion 131 is informed that the compression resulted in failure (step S427). Similarly to this, also in the case where there is no compressible data in step S420, the command analysis portion 131 is informed that the compression resulted in failure (step S427).

Figure 14:
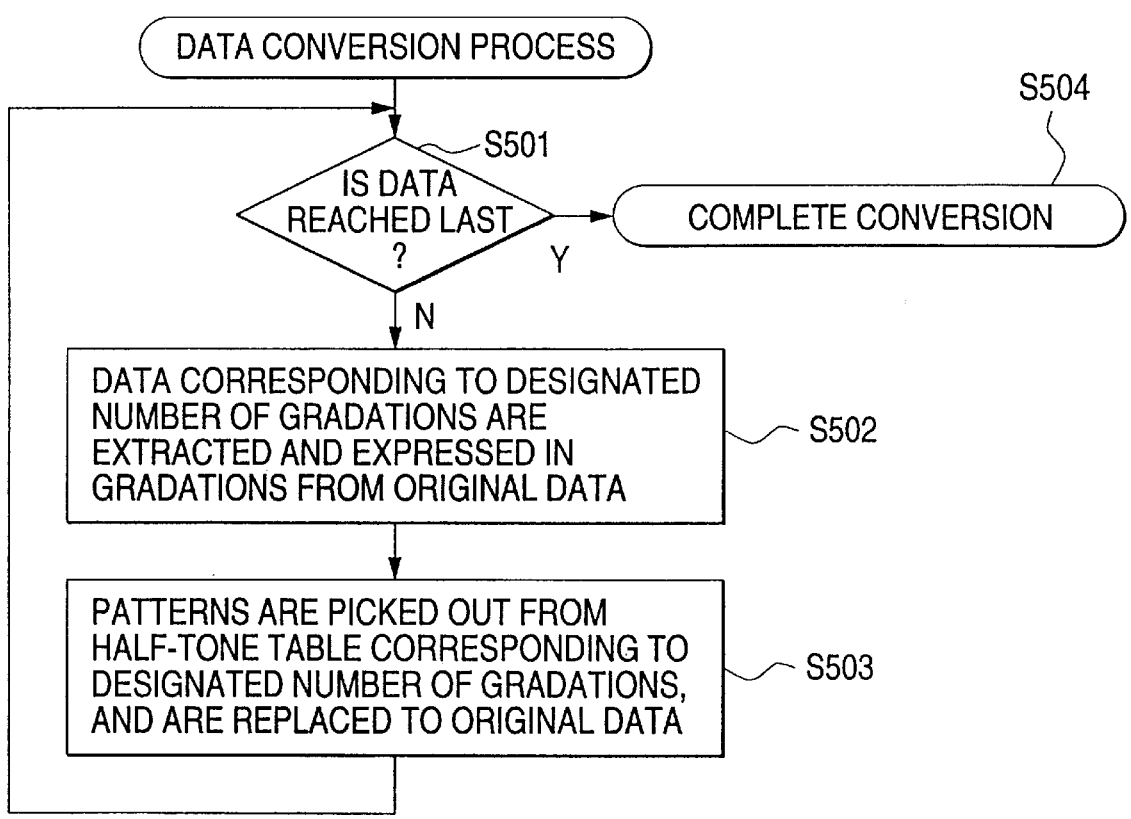
FIG. 14 is a flow chart of a data converting operation in a data conversion portion.

FIG. 14 shows a flow chart of a data conversion process in the data conversion portion 162. Here, description will be made, by way of example, about the case where the original image data are of a half-tone image such as a photograph. In this case, the designation of the data conversion method is made by designating the number of gradations in the half-tone image. In this example, it is now assumed that 5 gradations are designated at an initial stage and 17 gradations are designated at the next stage.

Figure 15:
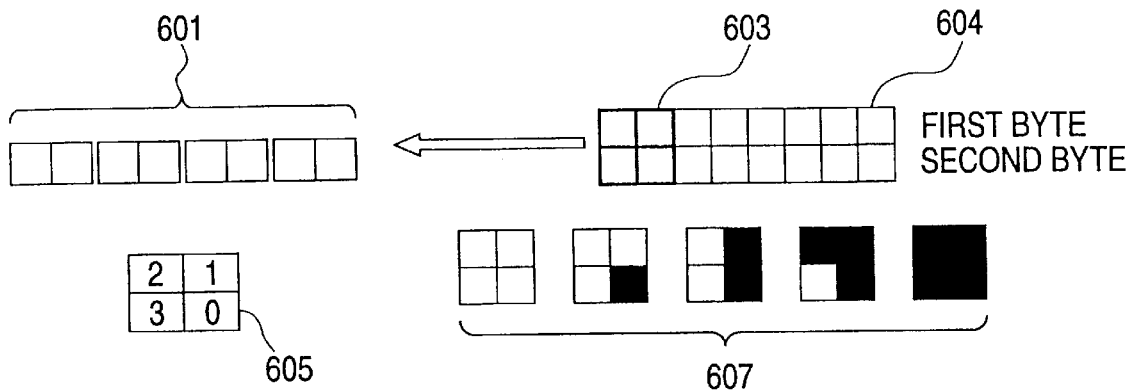
FIG. 15 is an explanatory diagram of compressible image data with 5 gradations.
Figure 16:
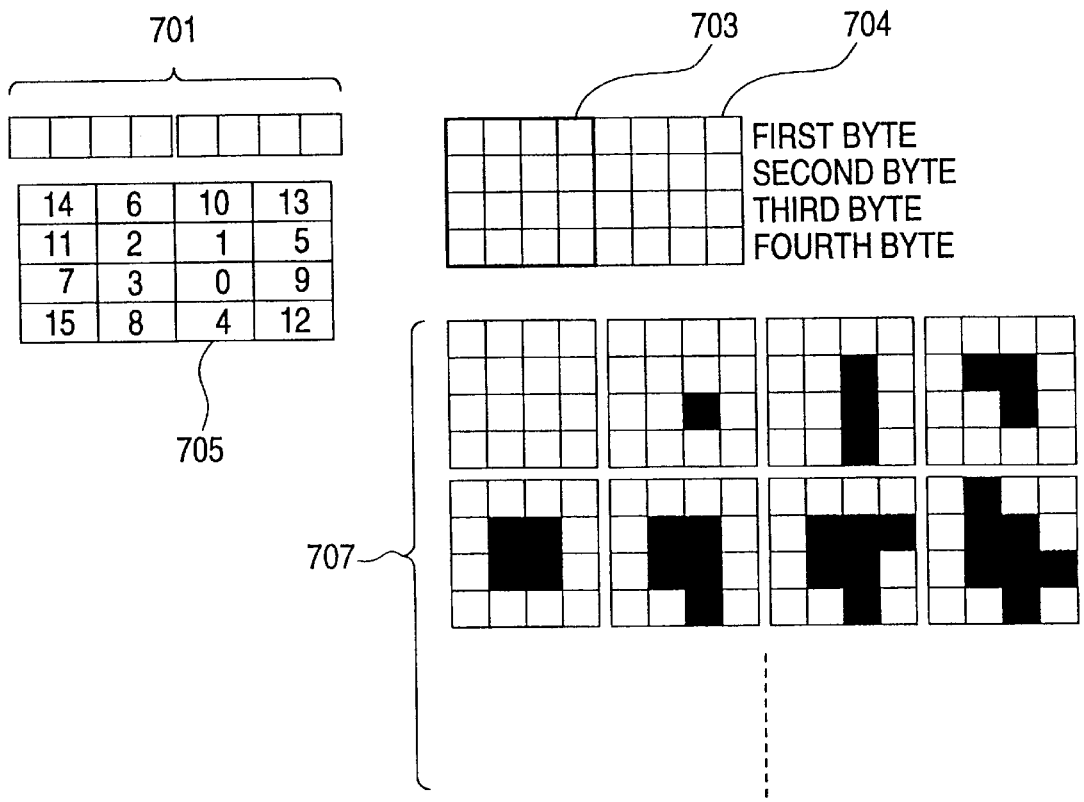
FIG. 16 is an explanatory diagram of compressible image data with 17 gradations.

As shown in FIG. 14, data corresponding to the designated number of gradations are first extracted and expressed in gradations (step S502) successively in order (step S501) from the first byte of the original image data. Corresponding dot patterns are picked out from a half-tone table (in which dot patterns as shown in FIGS. 15 and 16 which will be described later are stored) corresponding to the designated number of gradations, so that the original image data are replaced by the dot patterns (step S503). If a decision is made in the step S501 that the last byte of the original image data has been reached, the memory compression portion 161 is informed that the conversion of the original image data is completed (step S504).

Incidentally, the aforementioned half-tone tables are tables showing the correspondence between the dot patterns of the original image data and the dot patterns 607 and 707 for 5 gradations and 17 gradations respectively shown in FIGS. 15 and 16 which will be described later. The tables are programmed in advance. The original image data are replaced by the dot patterns 607 or 707 for 5 or 17 gradations in accordance with the correspondence in this table, by which the original image data can be converted into data of a compressible format with 5 or 17 gradations.

This data conversion will be described below more specifically.

FIG. 15 is an explanatory diagram of a conversion process in the case where 5 gradations are designated at the initial stage, and FIG. 16 is an explanatory diagram of a conversion process in the case where 17 gradations are designated at the second stage.

In FIG. 15, data of a compressible format with 5 gradations data of a format in which the density of one half-tone region is expressed in 5 gradations by using 5 kinds of dot patterns designated by the reference numeral 607 upon the assumption that a 4-pixel matrix of 2×2 pixels designated by the reference numeral 603 is defined to be one half-tone region. Although the data with 5 gradations are originally generated by applying a dither matrix as designated by the reference numeral 605 to the density value (0 to 4) of each half-tone region, this data conversion is designed as described above so that the data are generated by simple replacement with patterns in accordance with the half-tone table prepared in advance.

In the data with 5 gradations, 4 half-tone regions are formed by two bytes, that is, the first and second bytes as designated by the reference numeral 604, so that an upper half or a lower half of the 4 half-tone regions is assigned to one byte as designated by the reference numeral 601. It is apparent from 5 kinds of patterns designated by the reference numeral 607 that the variation of the dot pattern which can be taken by two pixels in each of an upper and lower half of each half-tone region is the three kinds "00", "01" and "11". Accordingly, one byte can form 3×3×3×3=81 kinds of dot patterns.

On the other hand, in FIG. 16, data of a compressible data with 17 gradations data of a format in which the density of one half-tone region is expressed in 17 gradations by using dot patterns partly exemplified by the reference numeral 707 upon the assumption that a 16-pixel matrix of 4×4 pixels as designated by the reference numeral 703 is defined to be one half-tone region. Although the data with 17 gradations are originally generated by applying a dither matrix as designated by the reference numeral 705 to the density value (0 to 16) of each half-tone region, this data conversion is designed as described above so that the data are generated by simple replacement with patterns in accordance with the half-tone table prepared in advance.

In the data with 17 gradations, 2 half-tone regions are formed by four bytes, that is, from the first byte to the fourth byte, as designated by the reference numeral 704, so that a quarter portion of 2 half-tone regions is assigned to one byte as designated by the reference numeral 701. The variation of the dot pattern which can be taken by 4 pixels in the quarter portion of each half-tone region is as follows.

(1) First Byte
"0000", "0100", "0110", "0111", "1111"
(2) Second Byte
"0000", "0010", "0110", "0111", "1111"
(3) Third Byte
"0000", "0010", "0110", "1110", "1111"
(4) Fourth Byte
"0000", "0010", "0110", "0111", "1111"

Accordingly, all the patterns which can be taken by the quarter portion are the seven kinds "0000", "0010", "0100", "0110", "0111", "1110" and "1111", so that the variation of the pattern which can be taken by one byte is 7×7=49 kinds. Incidentally, two kinds of combinations of "0010" and "0100", two kinds of combinations of "0111" and "1110" and two kinds of combinations of "0100" and "1110", that is, 6 kinds of combinations in total, do not appear in practice, so that patterns which appear in one byte in practice are 49−6=43 kinds.

Next, comparing 5-gradation data with 17-gradation data on the basis of the above consideration, dot patterns which appear in one byte are 81 kinds in 5-gradation data whereas such dot patterns are 43 kinds in 17-gradation data. That is, dot patterns which appear in the case of 17-gradation data are smaller in kind than dot patterns in the case of 5-gradation data. Here, as the dot patterns decrease in kind, the probability that patterns of adjacent bytes will coincide with each other increases, that is, the frequency of appearance of repetition patterns increases, so that compression is made easier. Accordingly, it can be said that 17-gradation data has a more compressible data format than the format of 5-gradation data.

Generally, as the number of gradations increases, more compressible data are obtained, that is, compressibility increases. On the contrary, because the number of gradations increases without any change of formal resolution, the area of one half-tone region increases and the mesh of the dot pattern becomes large to thereby lower picture quality. If the number of gradations is, however, set to be large in a range in which remarkable lowering of picture quality cannot be recognized by human naked eyes, compressibility can be increased without lowering of picture quality which becomes a problem substantially. When an original image of 600 dpi×600 dpi was processed with 5 gradations and with 17 gradations respectively in practice, obvious lowering of picture quality was not recognized by naked eyes.

Although the above description has been made upon data conversion of a half-tone image, a two-valued image such as line drawing or text is converted into more compressible data by stageously reducing spatial frequency in either or both of longitudinal and transverse directions as described above. Because the specific contents of individual conversion methods will be understood by those skilled in the art without any spacial description, the description thereof will be omitted.

In this manner, the data conversion portion 162 converts the original image data into data of a more compressible format stageously. In this case, the conversion method of the last stage is set to a limit in which distinction between the printed-out image and the original image is not recognized as remarkable distinction by human naked eyes.

As described above, in this embodiment, when the size of the real image data beforehand developed on the memory 17 after conversion of the intermediate code into the real image data is decided to be larger than the size of the free area in the memory 171, the original image data is stageously converted into image data of a more compressible format up to a limit in which distinction between the printed-out image and the original image cannot be recognized as remarkable distinction by human naked eyes, and then the compressible image data is compressed. As a result, data compression is made in necessary minimum requirement under substantially nearly stageless adjustment of compressibility without any remarkable lowering of picture quality, so that shortage of memory can be eliminated.

Further, because formal resolution is not changed when the original image data is converted into data of a compressible format, a print engine or a mechanism controller adapted to single resolution can be used sufficiently.

Further, because the conversion of the converted data is made by a method of performing compression while mainly paying attention to the repetition of one and the same pattern, there is little risk of erasing data necessary for restoring the original data from compressed data. The compression is substantially reversible compression. Accordingly, though lowering of picture quality caused by data conversion cannot but be allowed, a high-quality image can be restored so long as the lowering of picture quality caused by the data conversion is suppressed to a range in which there is substantially no problem.

Although the above description concerns typical embodiments of the present invention, it is a matter of course that the present invention is not limited to the aforementioned embodiments. For example, data conversion with 5 or 17 gradations or the like described in the second embodiment is only exemplified, and other various data conversion methods can be employed without departing from the gist of the present invention.

What is claimed is:

1. An apparatus for storing image data, comprising:
means for storing said image data, which is in a first data format, into a memory;
means for making a first judgment, for each element of said image data, as to whether a respective data size of said each element in said first data format exceeds a respective data size of said each element in a second data format;
means for making a second judgment, for each element of said image data, as to whether a total transformation time required to transform said each element in said first data format to said second data format exceeds a predetermined time limit, said predetermined time limit relating to a memory overrun time; and means for storing into said memory said each element using said second data format instead of said first data format when a result of at least one of said first judgment and said second judgment is affirmative;

wherein said second data format comprises bit map data.

2. The apparatus according to claim 1, wherein said first data format comprises intermediate codes.

3. A method of storing image data, comprising:

storing said image data, which is in a first data format, into a memory;

making a first judgment, for each element of said image data, as to whether a respective data size of said each element in said first data format exceeds a respective data size of said each element in a second data format;

making a second judgment, for each element of said image data, as to whether a total transformation time required to transform said each element in said first data format to said second data format exceeds a predetermined time limit, said predetermined time limit relating to a memory overrun time; and storing into said memory said each element using said second data format instead of said first data format when a result of at least one of said first judgment and said second judgment is affirmative;

wherein said second data format comprises bit map data.

4. The method according to claim 3, wherein said first data format comprises intermediate codes.

5. A device for storing image data for output, comprising:

means for producing first data format image data based on function calls relating to original image data, said first data format image data pertaining to a band of an output area, said first data format image data defining image data to be stored;

first judgment means for judging whether a respective size of said first data format image data exceeds a predetermined size threshold value;

second judgment means for judging whether a respective first data format to second data format conversion time for said first data format image data exceeds a predetermined time threshold value;

means for converting said first data format image data to second data format image data and for redefining said image data to be stored as said second data format image data, when at least one of said predetermined size threshold value and said predetermined time threshold value is judged to be exceeded; and means for storing said image data to be stored in a memory;

wherein said second data format image data comprises bit map data.

6. A method for storing image data for output, comprising:

producing first data format image data based on function calls relating to original image data, said first data format image data pertaining to a band of an output area, said first data format image data defining image data to be stored;

making a first judgment as to whether a respective size of said first data format image data exceeds a predetermined size threshold value;

making a second judgment as to whether a respective first data format to second data format conversion time for said first data format image data exceeds a predetermined time threshold value;

converting said first data format image data to second data format image data, and redefining said image data to be stored as said second data format image data, when at least one of said predetermined size threshold value and said predetermined time threshold value is judged to be exceeded; and storing said image data to be stored in a memory;

wherein said second data format image data comprises bit map data.

7. A device according to claim 5, wherein;

said predetermined size threshold value is based upon the capacity of said memory to store said band of said image data according to a bit map format.

8. A device according to claim 5, wherein said first data format is an intermediate code format which is different from the format of said original image data and the bit map format of output image data.

9. The device for storing image data for output according to claim 5, wherein said means for storing said image data to be stored in a memory includes:

compression methods, including an n-th and an n+1th compression method, said n+1th compression method providing a respective compressibility which is higher by one grade than that provided by said n-th compression method;

third judgment means for making a third judgment as to whether said memory includes a space area with sufficient capacity to store said image data to be stored;

means for performing compression when said third judgment indicates that said memory does not include said space area with said sufficient capacity, said compression comprising:

(a) selecting one of said compression methods; then (b) compressing said image data to be stored according to said selected compression method to produce compressed image data; then (c) determining whether said memory includes sufficient capacity to store said compressed image data; then (d) when said memory does not include sufficient capacity to store said compressed image data, selecting a next one of said compression methods as said selected compression method and again performing (b) and (c); and (e) when said memory includes sufficient capacity to store said compressed image data, storing said compressed image data as said image data to be stored.

10. A device according to claim 9, wherein:

said n-th compression method provides said compressed image data in an n-th data format and said n+1th compression method provides said compressed image data in an n+1th data format; and said n-th and said n+1th data formats are bit map formats which are different in the number of representable gradations.

11. A device according to claim 9, wherein:

said n-th compression method provides said compressed image data in an n-th data format and said n+1th compression method provides said compressed image data in an n+1th data format; and the difference in a real image between said n-th data format and n+1th data format is in the range in which the difference cannot be substantially recognized with the naked eye.

12. A device according to claim 9, wherein:

said n-th compression method provides said compressed image data in an n-th data format and said n+1th compression method provides said compressed image data in an n+1th data format; and said n-th data format and n+1th data format are the same in formal resolution.

13. A method according to claim 6, wherein:

said first data format is an intermediate code format which is different from the format of said original image data and the bit map format of output image data.

14. The method for storing image data for output according to claim 6, wherein said step of storing said image data to be stored in a memory further comprises:

providing compression methods, including an n-th and an n+1th compression method, said n+1th compression method providing a respective compressibility which is higher by one grade than that provided by said n-th compression method;

making a third judgment as to whether said memory includes a space area with sufficient capacity to store said image data to be stored;

when said third judgment indicates that said memory does not include said space area with said sufficient capacity, performing compression according to the steps of:

(a) selecting one of said compression methods;
(b) after said step (a), compressing said image data to be stored according to said selected compression method to produce compressed image data;
(c) after said step (b), determining whether said memory includes sufficient capacity to store said compressed image data;
(d) when said memory does not include sufficient capacity to store said compressed image data, selecting a next one of said compression methods as said selected compression method and again performing said steps (b) and (c); and
(e) when said memory includes sufficient capacity to store said compressed image data, storing said compressed image data as said image data to be stored.

15. A method according to claim 14, wherein:

said n-th compression method provides said compressed image data in an n-th data format and said n+1th compression method provides said compressed image data in an n+1th data format; and said n-th and said n+1th data formats are bit map formats which are different in the number of representable gradations.

16. A device according to claim 9, wherein:

said n-th compression method provides said compressed image data in an n-th data format and said n+1th compression method provides said compressed image data in an n+1th data format; and said n-th and said n+1th data formats are bit map formats which are different in a spatial frequency in a longitudinal direction and in a transverse direction.

17. A method according to claim 14, wherein:

said n-th compression method provides said compressed image data in an n-th data format and said n+1th compression method provides said compressed image data in an n+1th data format; and said n-th and said n+1th data formats are bit map formats which are different in a spatial frequency in a longitudinal direction and in a transverse direction.

18. A method according to claim 6, wherein;

said predetermined size threshold value is based upon the capacity of said memory to store said band of said image data according to a bit map format.

* * * * *